United States Patent
Kido et al.

(10) Patent No.: US 10,519,331 B2
(45) Date of Patent: Dec. 31, 2019

(54) INK, INKJET RECORDING METHOD, INKJET RECORDING APPARATUS, AND RECORDED MATTER

(71) Applicants: Masahiro Kido, Kanagawa (JP); Hidefumi Nagashima, Kanagawa (JP); Juichi Furukawa, Kanagawa (JP); Yuta Nakamura, Kanagawa (JP)

(72) Inventors: Masahiro Kido, Kanagawa (JP); Hidefumi Nagashima, Kanagawa (JP); Juichi Furukawa, Kanagawa (JP); Yuta Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/574,217

(22) PCT Filed: Jun. 3, 2016

(86) PCT No.: PCT/JP2016/002707
§ 371 (c)(1),
(2) Date: Nov. 15, 2017

(87) PCT Pub. No.: WO2016/199391
PCT Pub. Date: Dec. 15, 2016

(65) Prior Publication Data
US 2018/0127610 A1    May 10, 2018

(30) Foreign Application Priority Data

Jun. 10, 2015 (JP) ................................. 2015-117636
Jan. 15, 2016 (JP) ................................. 2016-006579

(51) Int. Cl.
*C09D 11/38* (2014.01)
*C09D 11/102* (2014.01)
(Continued)

(52) U.S. Cl.
CPC ............ *C09D 11/38* (2013.01); *C09D 11/102* (2013.01); *C09D 11/322* (2013.01);
(Continued)

(58) Field of Classification Search
CPC .............................. C09D 11/30; C09D 11/322
See application file for complete search history.

(56) References Cited

U.S. PATENT DOCUMENTS 6,764,173 B2 * 7/2004 Chen .......................... B41J 2/42
347/100
8,883,275 B2   11/2014 Nagashima et al.
(Continued)

FOREIGN PATENT DOCUMENTS

EP    3246369 A1    11/2017
EP    3406678 A1    11/2018
(Continued)

OTHER PUBLICATIONS

International Search Report dated Sep. 6, 2016 for counterpart International Patent Application No. PCT/JP2016/002707 filed Jun. 3, 2016.

(Continued)

*Primary Examiner* — Veronica F Faison
(74) *Attorney, Agent, or Firm* — Oblon, McClelland, Maier & Neustadt, L.L.P.

(57) ABSTRACT

Provided is an ink containing water, a plurality of organic solvents, a color material, and resin particles, wherein the plurality of organic solvents contain at least one compound having a hydrogen bond term δH, which is a Hansen solubility parameter, of 4.1 $MPa^{1/2}$ or higher but 9.5 $MPa^{1/2}$ or lower and a boiling point of 170° C. or higher and at least one diol compound containing 3 or 4 carbon atoms.

20 Claims, 2 Drawing Sheets

(51) Int. Cl.
*C09D 11/322* (2014.01)
*B41M 5/00* (2006.01)
(52) U.S. Cl.
CPC ......... *B41M 5/0011* (2013.01); *B41M 5/0047* (2013.01); *B41M 5/0064* (2013.01)

(56) References Cited

U.S. PATENT DOCUMENTS

| | | | |
|---|---|---|---|
| 8,899,719 | B2 | 12/2014 | Nagashima et al. |
| 9,108,439 | B2 | 8/2015 | Toda et al. |
| 9,163,160 | B2 | 10/2015 | Toda et al. |
| 9,243,158 | B2 | 1/2016 | Toda et al. |
| 2005/0176847 | A1 | 8/2005 | Cagle |
| 2006/0007287 | A1* | 1/2006 | Cagle ............... C09D 11/30 347/100 |
| 2010/0309260 | A1 | 12/2010 | Hakiri et al. |
| 2011/0183125 | A1 | 7/2011 | Aoki et al. |
| 2012/0176455 | A1 | 7/2012 | Ohta et al. |
| 2012/0262517 | A1* | 10/2012 | Takaku ............. C09D 11/322 347/20 |
| 2013/0194344 | A1 | 8/2013 | Yokohama et al. |
| 2013/0222464 | A1 | 8/2013 | Takaori et al. |
| 2013/0257034 | A1 | 10/2013 | Shimohara et al. |
| 2014/0192121 | A1 | 7/2014 | Bannai et al. |
| 2014/0220319 | A1 | 8/2014 | Koike et al. |
| 2014/0251179 | A1* | 9/2014 | Liu ..................... C08K 13/06 106/31.86 |
| 2014/0267520 | A1 | 9/2014 | Toda et al. |
| 2015/0017396 | A1 | 1/2015 | Nakagawa et al. |
| 2015/0050467 | A1 | 2/2015 | Nakagawa et al. |
| 2015/0077479 | A1 | 3/2015 | Nakagawa et al. |
| 2015/0116433 | A1 | 4/2015 | Fujii et al. |
| 2015/0138284 | A1 | 5/2015 | Nagashima et al. |
| 2015/0165787 | A1 | 6/2015 | Fujii et al. |
| 2015/0191614 | A1 | 7/2015 | Nagashima et al. |
| 2015/0258783 | A1 | 9/2015 | Toda et al. |
| 2015/0259553 | A1 | 9/2015 | Nakagawa et al. |
| 2015/0329731 | A1 | 11/2015 | Fujii et al. |
| 2015/0361282 | A1 | 12/2015 | Nakagawa et al. |
| 2015/0368492 | A1 | 12/2015 | Fujii et al. |
| 2016/0032122 | A1 | 2/2016 | Toda et al. |
| 2016/0068697 | A1 | 3/2016 | Toda et al. |
| 2016/0102220 | A1 | 4/2016 | Kido et al. |
| 2016/0152845 | A1 | 6/2016 | Okada et al. |
| 2016/0264808 | A1 | 9/2016 | Kido et al. |

FOREIGN PATENT DOCUMENTS

| | | |
|---|---|---|
| JP | 2005-220352 | 8/2005 |
| JP | 2008-200850 A | 9/2008 |
| JP | 2009-173805 | 8/2009 |
| JP | 2011-094082 | 5/2011 |
| JP | 2011-152747 A | 8/2011 |
| JP | 2012-224044 | 11/2012 |
| JP | 2012-224658 | 11/2012 |
| JP | 2013-158932 A | 8/2013 |
| JP | 2013-227498 A | 11/2013 |
| JP | 2014-058626 | 4/2014 |
| JP | 2014-198466 A | 10/2014 |
| JP | 2014-198824 A | 10/2014 |
| JP | 2014-224173 | 12/2014 |
| JP | 2015-034268 | 2/2015 |
| JP | 5703544 | 3/2015 |
| JP | 2016-169370 | 9/2016 |
| WO | WO 2014/119769 A1 | 8/2014 |
| WO | WO 2016/132858 A1 | 8/2016 |

OTHER PUBLICATIONS

Written Opinion dated Sep. 6, 2016 for counterpart International Patent Application No. PCT/JP2016/002707 filed Jun. 3, 2016.
Extended European Search Report dated Feb. 26, 2018 in European Patent Application No. 16807100.9, 7 pages.
Japanese Office Action dated Jul. 23, 2019, in Japanese Patent Application No. 2016-006579.
Extended European Search Report dated Aug. 27, 2019, in European Patent Application No. 19171768.5.
Japanese Office Action dated Oct. 1, 2019, in Japanese Patent Application No. 2016-006579 (with English Translation).

* cited by examiner

[Fig. 1]
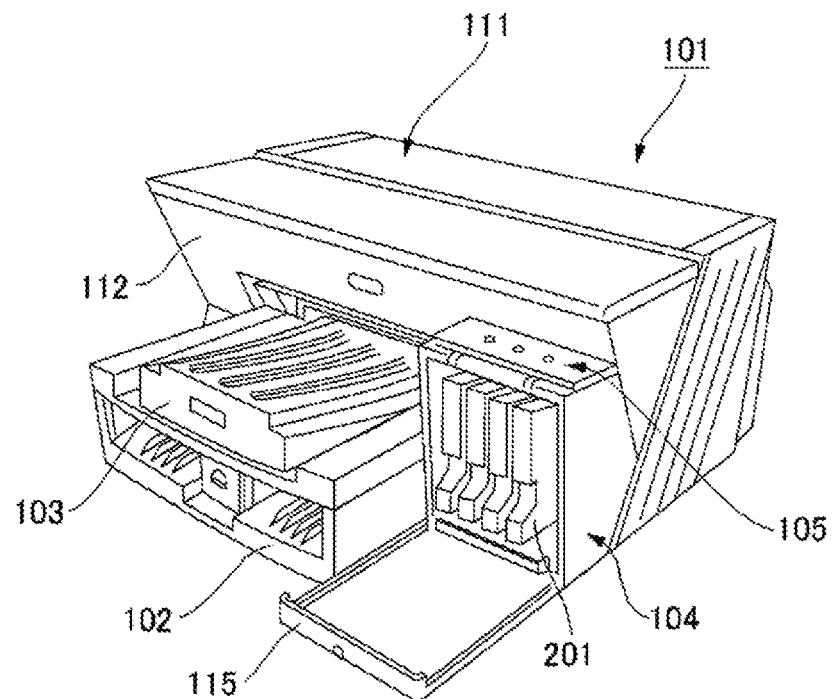
[Fig. 2]
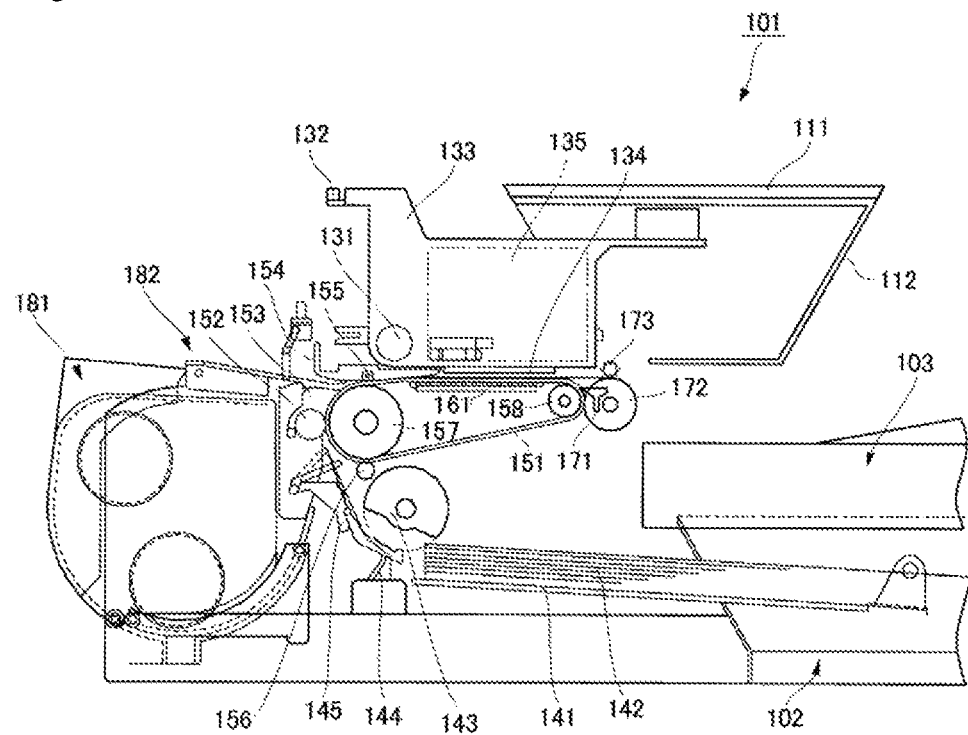

[Fig. 3]
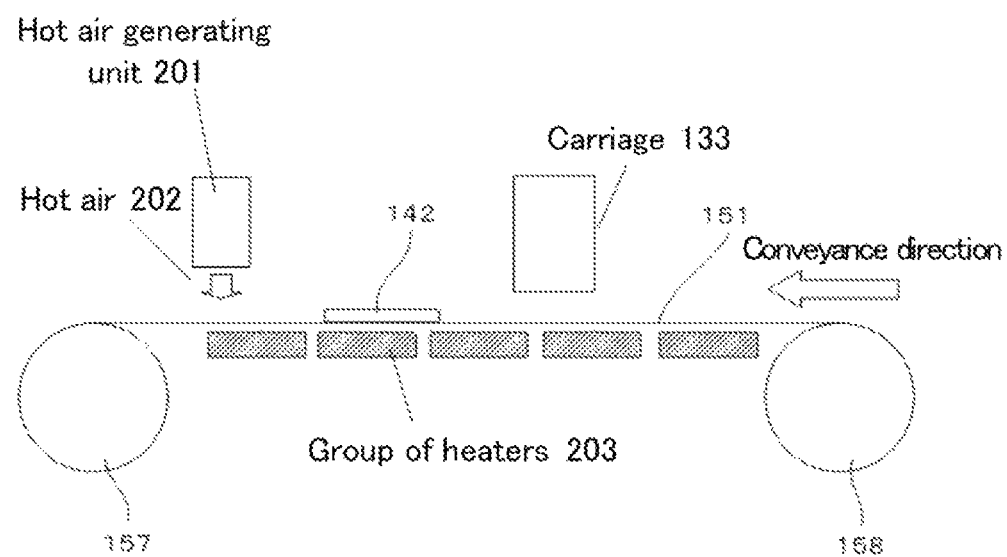

INK, INKJET RECORDING METHOD, INKJET RECORDING APPARATUS, AND RECORDED MATTER

TECHNICAL FIELD

The present disclosure relates to inks, inkjet recording methods, inkjet recording apparatuses, and recorded matters.

BACKGROUND ART

Impermeable base materials such as plastic films are used for industrial purposes such as advertisements and signages in order to improve durabilities such as light resistance, water resistance, and wear resistance. There have been developed various inks intended for use on the impermeable base materials.

Widely used among such inks are solvent-based inks using an organic solvent as a vehicle and ultraviolet-curable inks mainly made of a polymerizable monomer. However, there are concerns that the solvent-based inks may become hazardous to the environment through solvent vaporization. The ultraviolet-curable inks may be limited in selection of polymerizable monomers to be used in terms of safety.

Hence, there have been proposed water-based inks that are lowly environmentally hazardous and can be recorded directly over impermeable base materials (see, e.g., PTLs 1 and 2).

CITATION LIST

Patent Literature

PTL 1: Japanese Unexamined Patent Application Publication No. 2005-220352
PTL 2: Japanese Unexamined Patent Application Publication No. 2011-094082

SUMMARY OF INVENTION

Technical Problem

The present invention has an object to provide an ink having an excellent fixability over impermeable base materials, a favorable high-speed printability, a favorable discharging reliability, a favorable scratch resistance, and an excellent storage stability.

Solution to Problem

An ink of the present invention as a solution to the problems described above is an ink containing water, a plurality of organic solvents, a color material, and resin particles. The plurality of organic solvents contain at least one compound having a hydrogen bond term $\delta H$, which is a Hansen solubility parameter, of 4.1 $MPa^{1/2}$ or higher but 9.5 $MPa^{1/2}$ or lower and a boiling point of 170° C. or higher and at least one diol compound containing 3 or 4 carbon atoms.

Advantageous Effects of Invention

The present invention can provide an ink having an excellent fixability over impermeable base materials, a favorable high-speed printability, a favorable discharging reliability, a favorable scratch resistance, and an excellent storage stability.

BRIEF DESCRIPTION OF DRAWINGS

FIG. 1 is a schematic view illustrating an example of a serial-type inkjet recording apparatus of the present invention.

FIG. 2 is a schematic view illustrating a configuration in a main body of the inkjet recording apparatus of FIG. 1.

FIG. 3 is a schematic view illustrating an example of a heating unit of an inkjet recording apparatus of the present invention.

DESCRIPTION OF EMBODIMENTS (Ink)

An ink of the present invention contains water, a plurality of organic solvents, a color material, and resin particles, and further contains other components as needed. The plurality of organic solvents contain at least one compound having a hydrogen bond term $\delta H$, which is a Hansen solubility parameter, of 4.1 $MPa^{1/2}$ or higher but 9.5 $MPa^{1/2}$ or lower and a boiling point of 170° C. or higher and at least one diol compound containing 3 or 4 carbon atoms.

The ink of the present invention is based on a finding that there hitherto have been no water-based inks that are satisfactory in all of the following properties of fixability over impermeable base materials, high-speed printability, discharging reliability, scratch resistance, and storage stability.

Selection of the organic solvents, among the components contained in the ink, determines fixability of the ink over impermeable base materials over which the ink is recorded. Therefore, the organic solvents are highly responsible. The present inventors have found that addition of a compound of which hydrogen bond term $\delta H$, which is a Hansen solubility parameter, is in a predetermined range and a diol compound containing 3 or 4 carbon atoms in an ink remarkably improves fixability of the ink. The reason for the remarkable improvement of fixability is uncertain, but is inferred to be that a hydrogen bond term $\delta H$ of 4.1 $MPa^{1/2}$ or higher but 9.5 $MPa^{1/2}$ or lower improves affinity with impermeable base materials. The improved fixability of the ink over impermeable base materials makes it possible for a phenomenon (beading) that adjacent ones of ink droplets after having landed coalesce with each other into a shrunk state to be suppressed even in a high-speed printing operation to enable an image having a high quality. The present inventors have also found that an improved fixing speed leads to an improved secondary driability, leading to suppression of transfer to a back surface of a base material when the base material is taken up after recording.

Further, the present inventors have found that the organic solvent having a relatively high boiling point can suppress clogging about leading ends of nozzles of an inkjet recording apparatus and provide a high discharging reliability. Furthermore, the present inventors have found that surprisingly, addition of the organic solvents in a predetermined amount significantly improves robustness of a coating film formed after recording.

<Organic Solvents>

There is a need that the plurality of organic solvents contain at least one compound having a hydrogen bond term $\delta H$, which is a Hansen solubility parameter, of 4.1 $MPa^{1/2}$ or higher but 9.5 $MPa^{1/2}$ or lower and a boiling point of 170° C. or higher and at least one diol compound containing 3 or 4 carbon atoms.

-Compound Having a Hydrogen Bond Term $\delta H$, a Hansen Solubility Parameter, of 4.1 $MPa^{1/2}$ or Higher but 9.5 $MPa^{1/2}$ or Lower and a Boiling Point of 170° C. or Higher- Hansen solubility parameters (HSP) are a presentation of a solubility parameter introduced by Hildebrand in a three-dimensional space by means of division of the solubility parameter into three components including a dispersion term $\delta D$, a polarity term $\delta P$, and a hydrogen bond term H. The dispersion term $\delta D$ represents an effect obtained from a dispersion force. The polarity term $\delta P$ represents an effect obtained from a dipole-dipole force. The hydrogen bond term $\delta H$ represents an effect obtained from a hydrogen bonding strength.

The definition and calculation of the Hansen solubility parameters (HSP) are described in a document identified below.

Hansen, Charles M. Hansen Solubility Parameters: A Users Handbook, CRC Press, Inc., 2007.

Solubility parameters (HSP) [$\delta D$, $\delta P$, and $\delta H$] of a solvent can be easily estimated from a chemical structure of the solvent, using, for example, computer software HANSEN SOLUBILITY PARAMETERS IN PRACTICE (HSPIP). In the present invention, Hansen solubility parameters to be used for any solvent registered in a database of HSPIP version 3.0.38 are the values registered in the database, and Hansen solubility parameters to be used for any solvent that is not registered in the database are values estimated with HSPIP version 3.0.38.

It is possible to know a characteristic of an organic solvent by calculating ratios (percentages) of the three solubility parameter components (dispersion term $\delta D$, polarity term $\delta P$, and hydrogen bond term $\delta H$) to the total solubility parameter as Fd, Fp, and Fh according to mathematical formulae 1 below and a mathematical formula 2 below.

[Math. 1]

$Fd\ (\%) = \delta D/(\delta D + \delta P + \delta H) \times 100$ $Fp\ (\%) = \delta P/(\delta D + \delta P + \delta H) \times 100$ $Fh(\%) = \delta H/(\delta D + \delta P + \delta H) \times 100$ <Mathematical formulae 1>

[Math. 2]

$Fd + Fp + Fh = 100\%$ <Mathematical formula 2>

In the present invention, recording of an image with an ink containing a compound having a hydrogen bond term $\delta H$, which is a Hansen solubility parameter, of 4.1 MPa$^{1/2}$ or higher but 9.5 MPa$^{1/2}$ or lower and a boiling point of 170° C. or higher will find the organic solvent instantaneously permeating an impermeable base material, particularly, a vinyl chloride base material in an ink fixing step. This can improve an ink fixing speed.

Fh of the organic solvent is preferably 16% or higher but 25% or lower. Fh of 16% or higher but 25% or lower provides a more excellent affinity with vinyl chloride, leading to an advantage of further improving the ink fixing speed.

The compound having a hydrogen bond term $\delta H$, which is a Hansen solubility parameter, of 4.1 MPa$^{1/2}$ or higher but 9.5 MPa$^{1/2}$ or lower and a boiling point of 170° C. or higher is not particularly limited and may be appropriately selected depending on the intended purpose. Examples of the compound include 3-methoxy-N,N-dimethylpropionamide ($\delta H$: 4.1 MPa$^{1/2}$, Fh: 16%, boiling point: 216° C.), 3-butoxy-N,N-dimethylpropionamide ($\delta H$: 7.0 MPa$^{1/2}$, Fh: 17%, boiling point: 252° C.), diethylene glycol diethylether ($\delta H$: 9.5 MPa$^{1/2}$, Fh: 25%, boiling point: 180° C.), dibenzylether ($\delta H$: 7.4 MPa$^{1/2}$, Fh: 26%, boiling point: 298° C.), tetramethylurea ($\delta H$: 8.1 MPa$^{1/2}$, Fh: 22%, boiling point: 177° C.), 2-pyrrolidone ($\delta H$: 5.2 MPa$^{1/2}$, Fh: 20%, boiling point: 245° C.), 1-n-octyl-2-pyrrolidone ($\delta H$: 8.4 MPa$^{1/2}$, Fh: 21%, boiling point: 170° C.), and 1,3-dimethyl-2-imidazolidinone ($\delta H$: 6.7 MPa$^{1/2}$, Fh: 21%, boiling point: 224° C.). One of these compounds may be used alone or two or more of these compounds may be used in combination. Among these compounds, 3-methoxy-N,N-dimethylpropionamide, 3-butoxy-N,N-dimethylpropionamide, diethylene glycol diethylether, tetramethylurea, 2-pyrrolidone, 1-n-octyl-2-pyrrolidone, and 1,3-dimethyl-2-imidazolidinone are preferable in terms of fixability, non-transferability, and discharging reliability.

Addition of the organic solvent having a hydrogen bond term $\delta H$, which is a Hansen solubility parameter, of 4.1 MPa$^{1/2}$ or higher but 9.5 MPa$^{1/2}$ or lower and a boiling point of 170° C. or higher can improve affinity of the ink or the organic solvent with a vinyl chloride base material and ensure a high fixability. Further, the organic solvent having a relatively high boiling point can suppress a resin coating film from being formed about leading ends of nozzles of an inkjet recording apparatus and ensure a high discharging reliability.

A content of the compound having a hydrogen bond term $\delta H$, which is a Hansen solubility parameter, of 4.1 MPa$^{1/2}$ or higher but 9.5 MPa$^{1/2}$ or lower and a boiling point of 170° C. or higher is preferably greater than or equal to 5% by mass but less than or equal to 60% by mass, more preferably greater than or equal to 10% by mass but less than or equal to 50% by mass, and yet more preferably greater than or equal to 20% by mass but less than or equal to 40% by mass of a total content of the organic solvents in the ink. A content of greater than or equal to 5% by mass improves affinity between the ink and a vinyl chloride base material and provide a favorable fixability when the ink is used in an inkjet recording method. A content of less than or equal to 60% by mass can provide a high ink storage stability.

The content of the compound having a hydrogen bond term $\delta H$, which is a Hansen solubility parameter, of 4.1 MPa$^{1/2}$ or higher but 9.5 MPa$^{1/2}$ or lower and a boiling point of 170° C. or higher can be confirmed by a gas chromatograph-mass spectrometry (GCMS). Specifically, the ink as a whole is subjected to GCMS to qualitatively analyze any solvents contained. When the kinds of the solvents are successfully specified, a standard curve of the concentration of each solvent is generated. This enables quantification of each organic solvent contained in the ink.

-Diol Compound Containing 3 or 4 Carbon Atoms-

Addition of a diol compound containing 3 or 4 carbon atoms among the organic solvents improves scratch resistance, fixability, and non-transferability.

Examples of the diol compound containing 3 or 4 carbon atoms include 1,2-propanediol, 1,3-propanediol, 1,2-butanediol, and 2,3-butanediol. One of these diol compounds may be used alone or two or more of these diol compounds may be used in combination.

A content of the diol compound containing 3 or 4 carbon atoms is preferably greater than or equal to 5% by mass but less than or equal to 40% by mass and more preferably greater than or equal to 10% by mass but less than or equal to 27% by mass of the total content of the organic solvents in the ink.

-Compound Containing Alkoxy Group-

It is preferable that the plurality of organic solvents further contain a compound containing an alkoxy group.

Addition of the compound containing an alkoxy group among the organic solvents provides a high compatibility with respect to resins or pigments, enables resins or pigments dispersed in the ink to be present without aggregating, and improves storage stability of the ink.

Examples of the compound containing an alkoxy group include 3-methoxy-3-methyl-1-butanol.

A content of the compound containing an alkoxy group is preferably greater than or equal to 1% by mass but less than or equal to 10% by mass and more preferably greater than or equal to 2% by mass but less than or equal to 6% by mass of the total content of the organic solvents in the ink.

The ink of the present invention may contain any other organic solvent as needed in addition to the compound having a hydrogen bond term δH, which is a Hansen solubility parameter, of 4.1 MPa$^{1/2}$ or higher but 9.5 MPa$^{1/2}$ or lower and a boiling point of 170° C. or higher, the diol compound containing 3 or 4 carbon atoms, and the compound containing an alkoxy group.

Examples of the any other organic solvent include: polyvalent alcohols such as ethylene glycol, diethylene glycol, 3-methyl-1,3-butanediol, 2-methyl-2,4-pentanediol, triethylene glycol, polyethylene glycol, polypropylene glycol, 1,5-pentanediol, 1,6-hexanediol, glycerin, 1,2,6-hexanetriol, 2-ethyl-1,3-hexanediol, 1,2,4-butanetriol, 1,2,3-butanetriol, and 3-methyl-1,3,5-pentanetriol; polyvalent alcohol alkylethers such as ethylene glycol monoethylether, ethylene glycol monobutylether, diethylene glycol monomethylether, diethylene glycol monoethylether, diethylene glycol monobutylether, tetraethylene glycol monomethylether, dipropylene glycol monomethylether, and propylene glycol monoethylether; polyvalent alcohol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethylimidazolidinone, epsilon-caprolactam, and gamma-butyrolactone; amides such as formamides, N-methylformamide, and N,N-dimethylformamide; amines such as monoethanolamine, diethanolamine, and trimethylamine; sulfur-containing compounds such as dimethylsulfoxide, sulfolane, and thiodiethanol; propylene carbonate; and ethylene carbonate. One of these organic solvents may be used alone or two or more of these organic solvents may be used in combination.

A boiling point of all of the organic solvents contained in the ink is preferably 150° C. or higher but 270° C. or lower and more preferably 170° C. or higher but 250° C. or lower.

A boiling point of 170° C. or higher but 250° C. or lower provides a high discharging reliability and makes a formed image favorably driable.

The total content of the organic solvents is not particularly limited and may be appropriately selected depending on the intended purpose. However, the total content of the organic solvents is preferably greater than or equal to 20% by mass but less than or equal to 70% by mass and more preferably greater than or equal to 30% by mass but less than or equal to 60% by mass of a total amount of the ink. A content of greater than or equal to 20% by mass but less than or equal to 70% by mass provides an excellent driability and a favorable discharging stability.

<Resin Particles>

The resin particles are not particularly limited and may be appropriately selected depending on the intended purpose. Examples of the resin particles include: condensed synthetic resin particles such as polyester resin particles, polyurethane resin particles, epoxy resin particles, polyamide resin particles, polyether resin particles, acrylic resin particles, acrylic-silicone resin particles, and fluorine-based resins; additive synthetic resin particles such as polyolefin resin particles, polystyrene-based resin particles, polyvinylalcohol resin particles, polyvinylester resin particles, polyacrylic acid resin particles, and unsaturated carboxylic acid-based resins; and natural polymers such as celluloses, rosins, and natural rubbers. One kind of these resin particles may be used alone or two or more kinds of these resin particles may be used in combination.

In terms of fixability and ink storage stability, preferable among these resin particles are acrylic resin particles, acrylic-silicone resin particles, and polyurethane resin particles, and more preferable is polyurethane resin particles. In terms of scratch resistance of an image, preferable are polyester resin particles, polyvinyl chloride resin particles, and polyurethane resin particles. In terms of close adhesiveness with impermeable base materials, preferable is polyester resin particles.

The resin particles are not particularly limited and may be an appropriately synthesized product or a commercially available product.

-Polyurethane Resin Particles-

The polyurethane resin particles are not particularly limited and may be appropriately selected depending on the intended purpose. Examples of the polyurethane resin particles include polyurethane resin particles obtained by reacting a polyol with a polyisocyanate.

Examples of the polyol include polyether polyols, polycarbonate polyols, and polyester polyols. One of these polyols may be used alone or two or more of these polyols may be used in combination.

--Polyether Polyols--

Examples of the polyether polyols include a polyether polyol obtained by polymerizing a starting material, which is at least one kind of a compound containing 2 or more active hydrogen atoms, through addition of an alkylene oxide.

Examples of the starting material include ethylene glycol, diethylene glycol, triethylene glycol, propylene glycol, trimethylene glycol, 1,3-butanediol, 1,4-butanediol, 1,6-hexanediol, glycerin, trimethylolethane, and trimethylolpropane. One of these starting materials may be used alone or two or more of these starting materials may be used in combination.

Examples of the alkylene oxide include ethylene oxide, propylene oxide, butylene oxide, styrene oxide, epichlorohydrin, and tetrahydrofuran. One of these alkylene oxides may be used alone or two or more of these alkylene oxides may be used in combination.

Examples of the polyether polyols for obtaining a binder for an ink capable of imparting an extraordinarily excellent scratch resistance include polyoxytetramethylene glycols and polyoxypropylene glycols. One of these polyether polyols may be used alone or two or more of these polyether polyols may be used in combination.

-Polycarbonate Polyols-

Examples of the polycarbonate polyols that can be used for producing the polyurethane resin particles include polycarbonate polyols obtained through a reaction between ester carbonate and polyol and polycarbonate polyols obtained through a reaction between phosgene and bisphenol A or the like. One of these polycarbonate polyols may be used alone or two or more of these polycarbonate polyols may be used in combination.

Examples of the ester carbonate include methyl carbonate, dimethyl carbonate, ethyl carbonate, diethyl carbonate, cyclocarbonate, and diphenyl carbonate. One of these ester carbonates may be used alone or two or more of these ester carbonates may be used in combination.

Examples of the polyol include: dihydroxy compounds having a relatively low molecular weight such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-hepetanediol, 1,8-octanediol, 1,9-nonanediol, 1,10-decanediol, 1,11-undecanediol, 1,12-dodecanediol, 1,4-cyclohexanediol, 1,4-cyclohexanedimethanol, hydroquinone, resorcin, bisphenol-A, bisphenol-F, and 4,4'-biphenol; polyether polyols such as polyethylene glycols, polypropylene glycols, and polyoxytetramethylene glycols; and polyester polyols such as polyhexamethylene adipates, polyhexamethylene succinates, and polycaprolactones. One of these polyols may be used alone or two or more of these polyols may be used in combination.

--Polyester Polyols--

Examples of the polyester polyols include polyester polyols obtained by making a low-molecular-weight polyol and a polycarboxylic acid undergo an esterification reaction, polyesters obtained by making a cyclic ester compound such as epsilon-caprolactone undergo a ring-opening polymerization reaction, and copolymerized polyesters of these polyesters. One of these polyester polyols may be used alone or two or more of these polyester polyols may be used in combination.

Examples of the low-molecular-weight polyol include ethylene glycol and propylene glycol. One of these low-molecular-weight polyols may be used alone or two or more of these low-molecular-weight polyols may be used in combination.

Examples of the polycarboxylic acid include succinic acid, adipic acid, sebacic acid, dodecanedicarboxylic acid, terephthalic acid, isophthalic acid, phthalic acid, and anhydrides or ester-forming derivatives of these acids. One of these polycarboxylic acids may be used alone or two or more of these polycarboxylic acids may be used in combination.

--Polyisocyanate--

Examples of the polyisocyanate include: aromatic diisocyanates such as phenylene diisocyanate, tolylene diisocyanate, diphenylmethane diisocyanate, and naphthalene diisocyanate; and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, and 2,2,4-trimethylhexamethylene diisocyanate. One of these polyisocyanates may be used alone or two or more of these polyisocyanates may be used in combination. Preferable among these polyisocyanates are aliphatic or alicyclic diisocyanates in terms of weather resistance over a long period of time, because the ink of the present invention will be used also for outdoor use such as a poster or a signage, so that the ink needs to form a coating film having a very high weather resistance over a long period of time.

Furthermore, additional use of at least one alicyclic diisocyanate makes it easier to obtain an intended coating film strength and an intended scratch resistance.

Examples of the alicyclic diisocyanate include isophorone diisocyanate and dicyclo-hexylmethanediisocyanate.

A content of the alicyclic diisocyanate is preferably greater than or equal to 60% by mass of a total amount of isocyanate compounds.

<Method for Producing Polyurethane Resin Particles>

The polyurethane resin particles used in the ink of the present invention can be obtained according to producing methods hitherto commonly used. One example of the producing methods hitherto commonly used include the following method.

First, in the absence of a solvent or in the presence of an organic solvent, the polyol is allowed to react with the polyisocyanate in an equivalent ratio so that isocyanate groups are excessively present, to produce an isocyanate-terminated urethane prepolymer.

Next, anionic groups in the isocyanate-terminated urethane prepolymer are optionally neutralized with a neutralizing agent and allowed to react with a chain extender, and, finally, the organic solvent in a system is optically removed. As a result, the polyurethane resin particles are obtained.

Examples of the organic solvent that can be used for producing the polyurethane resin particles include: ketones such as acetone and methyl ethyl ketone; ethers such as tetrahydrofuran and dioxane; ester acetates such as ethyl acetate and butyl acetate; nitriles such as acetonitrile; and amides such as dimethyl formamide, N-methylpyrrolidone, and N-ethylpyrrolidone. One of the organic solvents may be used alone or two or more of these organic solvents may be used in combination.

Examples of the chain extender include polyamines and other active hydrogen group-containing compounds.

Examples of the polyamines include: diamines such as ethylene diamine, 1,2-propane diamine, 1,6-hexamethylenediamine, piperazine, 2,5-dimethyl piperazine, isophoronediamine, 4,4'-dicyclohexylmethane diamine, and 1,4-cyclohexane diamine; polyamines such as diethylenetriamine, dipropylene triamine, and triethylene tetramine; hydrazines such as hydrazine, N,N'-dimethyl hydrazine, and 1,6-hexamethylene bishydrazine; and dihydrazides such as succinic dihydrazide, adipic dihydrazide, glutaric dihydrazide, sebacic dihydrazide, and isophthalic dihydrazide. One of these polyamines may be used alone or two or more of these polyamines may be used in combination.

Examples of the other active hydrogen group-containing compounds include glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; phenols such as bisphenol A, 4,4'-dihydroxy diphenyl, 4,4'-dihydroxydiphenyl ether, 4,4'-dihydroxydiphenyl sulfone, hydrogenated bisphenol A, and hydroquinone; and water. One of these active hydrogen group-containing compounds may be used alone or two or more of these active hydrogen group-containing compounds may be used in combination so long as an ink is not deteriorated in storage stability.

Preferable as the polyurethane resin particles is polycarbonate urethane resin particles in terms of water resistance, heat resistance, wear resistance, weather resistance, and image scratch resistance that are based on a high cohesive force of a carbonate group. Use of the polycarbonate urethane resin particles makes it possible to obtain an ink suitable for a recorded matter to be used in a severe environment such as outdoor.

The polyurethane resin particles may be a commercially available product. Examples of the commercially available product include YUKOTO UX-485 (polycarbonate urethane resin particles), YUKOTO UWS-145 (polyester urethane resin particles), PAMARIN UA-368T (polycarbonate urethane resin particles), and PAMARIN UA200 (polyether urethane resin particles (all available from Sanyo Chemical Industries, Ltd.). One of these products may be used alone or two or more of these products may be used in combination.

-Vinyl Chloride Resin Particles-

Preferable as the vinyl chloride resin particles are a vinyl chloride-ethylene copolymer and a vinyl chloride-acrylic copolymer in terms of securing miscibility with a pigment and any other resin particles contained in the ink. More preferable is a vinyl chloride-ethylene copolymer because of a particularly excellent close adhesiveness with a non-polar base material.

The vinyl chloride resin particles are not particularly limited and may be a commercially available product. Examples of the vinyl chloride resin particles include a commercially available polyvinyl chloride resin emulsion, a commercially available vinyl chloride-acrylic copolymer emulsion, and a commercially available vinyl chloride-ethylene copolymer emulsion. One of these vinyl chloride resin particles may be used alone or two or more of these vinyl chloride resin particles may be used in combination.

Examples of the commercially available polyvinyl chloride resin emulsion include product No. 985 (solid content: 40% by mass, anionic) among VINYBLAN (registered trademark) series available from Nissin Chemical Co., Ltd. One of these commercially available polyvinyl chloride resin emulsions may be used alone or two or more of these commercially available polyvinyl chloride resin emulsions may be used in combination.

Examples of the commercially available vinyl chloride-acrylic copolymer emulsion include product Nos. 278 (solid content: 43% by mass, anionic), 700 (solid content: 30% by mass, anionic), 701 (solid content: 30% by mass, anionic), 711 (solid content: 50% by mass, anionic), 721 (solid content: 30% by mass, anionic), 700FS (solid content: 30% by mass, anionic), 701RL35 (solid content: 30% by mass, anionic), 701RL (solid content: 30% by mass, anionic), and 701RL65 (solid content: 30% by mass, anionic) among VINYBLAN (registered trademark) series available from Nissin Chemical Co., Ltd. One of these commercially available vinyl chloride-acrylic copolymer emulsions may be used alone or two or more of these commercially available vinyl chloride-acrylic copolymer emulsions may be used in combination.

Examples of the commercially available vinyl chloride-ethylene copolymer emulsion include product Nos. 1010 (solid content: 50±1% by mass, anionic), 1210 (solid content: 50±1% by mass, anionic), and 1320 (solid content: 50±1% by mass, anionic) among SUMIELITE (registered trademark) series available from Sumika Chemtex Co., Ltd. One of these commercially available vinyl chloride-ethylene copolymer emulsions may be used alone or two or more of these commercially available vinyl chloride-ethylene copolymer emulsions may be used in combination.

Examples of other commercially available products include product Nos. E15/48A (solid content: 50% by mass, anionic) and E22/48A (solid content: 30% by mass, anionic) among VINNOL series that are available from Wacker Chemie AG and obtained by incorporating a hydroxyl component into a vinyl chloride resin. One of these commercially available products may be used alone or two or more of these commercially available products may be used in combination.

-Polyester Resin Particles-

Preferable as the polyester resin particles are polyester resin particles free of a hydrophilic component such as an emulsifier and a sulfonic acid salt that may remain in a coating film after dried in order to obtain water resistance of an image.

The polyester resin particles are not particularly limited and may be a commercially available product. Examples of commercially available polyester resin emulsions include: product Nos. KZA-1449 (solid content: 30% by mass, anionic), KZA-3556 (solid content: 30% by mass, anionic), and KZA-0134 (solid content: 30% by mass, anionic) among EMULSION ELIETEL (registered trademark) series available from Unitika Ltd.; and product Nos. A-124GP (solid content: 30% by mass), A-1255 (solid content: 30% by mass), and A-160P (solid content: 25% by mass) among PESRESIN A series available from Takamatsu Oil & Fat Co., Ltd. One of these commercially available polyester resin emulsions may be used alone or two or more of these commercially available polyester resin emulsions may be used in combination.

The resin particles are not particularly limited and are preferably resin particles supplied in a state of a water-based emulsion. Considering ease of an operation for blending the resin particles with a solvent, a colorant, and water to prepare a water-based ink, uniform dispersion of the resin particles in the ink to the maximum degree possible, etc., it is preferable to add the resin particles in the ink in a resin emulsion state, which is a state in which the resin particles are stably dispersed in water, which is a dispersion medium.

In actual use, the resin particles are facilitated to form a film by a water-soluble organic solvent added during ink production and are promoted to form a film upon vaporization of the solvent and water. Therefore, a heating step is not indispensable in use of the ink of the present invention.

Upon dispersing the resin particles into an aqueous medium, forced emulsification utilizing a dispersing agent may be used. In the case of forced emulsification, however, the dispersing agent may remain on a coating film to decrease strength of the coating film. In order to prevent this result, so-called self-emulsifying resin particles which have anionic groups in a molecular structure are preferable.

An acid value of the anionic groups of the self-emulsifying resin particles is preferably 5 mgKOH/g or higher but 100 mgKOH/g or lower and more preferably 5 mgKOH/mg or higher but 50 mgKOH/mg or lower from the viewpoint of dispersibility in water, scratch resistance, and chemical resistance.

Examples of the anionic groups include a carboxyl group, a carboxylate group, a sulfonic group, and a sulfonate group. Among these anionic groups, a carboxylate group and a sulfonate group that are partially or totally neutralized with, for example, a basic compound are preferable from the viewpoint of maintaining good water-dispersion stability. It is possible to use a monomer containing the anionic groups in order to incorporate the anionic groups into the resin.

Examples of a method for producing a water dispersion of the resin particles containing the anionic groups include a method for adding a basic compound which can be used for neutralizing the anionic groups in the water dispersion.

Examples of the basic compound include: organic amines such as ammonia, trimethyl amine, pyridine, and morpholine; alkanol amines such as monoethanolamine; and metallic base compounds containing, for example, Na, K, Li, or Ca. One of these basic compounds may be used alone or two or more of these basic compounds may be used in combination.

The method for producing a water dispersion of the forced-emulsifying resin particles may use a surfactant. Examples of the surfactant include nonionic surfactants and anionic surfactants. One of these surfactants may be used alone or two or more of these surfactants may be used in combination. Among these surfactants, nonionic surfactants are preferable from the viewpoint of water resistance.

Examples of the nonionic surfactants include polyoxyethylene alkyl ether, polyoxyethylene alkylene alkyl ether, polyoxyethylene derivatives, polyoxyethylene fatty acid esters, polyoxyethylene polyvalent alcohol fatty acid esters, polyoxyethylene propylene polyols, sorbitan fatty acid esters, polyoxyethylene hydrogenated castor oils, polyoxyalkylene polycyclic phenyl ethers, polyoxyethylene alkylamines, alkylalkanolamides, and polyalkylene glycol (meth)acrylates. Among these nonionic surfactants, preferable are polyoxyethylene alkylethers, polyoxyethylene fatty acid esters, polyoxyethylene sorbitan fatty acid esters, and polyoxyethylene alkylamines. One of these nonionic surfactants may be used alone or two or more of these nonionic surfactants may be used in combination.

Examples of the anionic surfactants include alkyl sulfuric acid ester salts, polyoxyethylene alkylether sulfates, alkyl benzene sulfonates, alpha-olefin sulfonates, methyl taurate, sulfosuccinate, ether sulfonates, ether carbonates, fatty acid salts, naphthalene sulfonate formalin condensates, alkyl amine salts, quaternary ammonium salts, alkyl betaines, and alkyl amine oxides. Among these anionic surfactants, preferable are polyoxyethylene alkylether sulfates and sulfosuccinate.

A content of the surfactant is not particularly limited and may be appropriately selected depending on the intended purpose. However, the content is preferably greater than or equal to 0.1% by mass but less than or equal to 30% by mass and more preferably greater than or equal to 5% by mass but less than or equal to 20% by mass of a total amount of the resin particles. When the content is greater than or equal to 0.1% by mass but less than or equal to 30% by mass, the resin particles form a film favorably, an ink excellent in adherability and water resistance is obtained, and a recorded matter is used favorably without blocking.

A volume average particle diameter of the resin particles is not particularly limited and may be appropriately selected depending on the intended purpose. However, considering use in an inkjet recording apparatus, the volume average particle diameter is preferably 10 nm or greater but 1,000 nm or less, more preferably 10 nm or greater but 200 nm or less, and particularly preferably 10 nm or greater but 100 nm or less.

Resin particles having a volume average particle diameter of 10 nm or greater but 1,000 nm or less have more sites to contact a water-soluble organic solvent on the surface and have a higher film forming performance to form a tough continuous coating film of the resin. This makes it possible to obtain a high image hardness.

The volume average particle diameter can be measured with, for example, a particle size analyzer (MICROTRAC MODEL UPA 9340 available from Nikkiso Co., Ltd.).

A content of the resin particles is preferably greater than or equal to 1% by mass but less than or equal to 15% by mass of the total amount of the ink in terms of fixability and ink storage stability, and more preferably greater than or equal to 5% by mass but less than or equal to 12% by mass of the total amount of the ink because improved smoothness of an ink coating film, a high gloss level, and an improved fixability over impermeable base materials will be obtained.

Qualitative and quantitative properties of the resin particles can be confirmed according to a procedure as detailed in Yasuda, Takeo. "Test methods and evaluation results of dynamic characteristics of plastic materials (22)", Plastics: Journal of the Japan Plastics Industry Federation, "Plastics" editors board. Specifically, qualitative and quantitative properties can be confirmed by an analysis according to infrared spectroscopy (IR), a thermal analysis (DSC, TG/DTA), pyrolysis gas chromatography (PyGC), nuclear magnetic resonance (NMR), etc.

The ink of the present invention can be improved in adherability if the ink is heated after recording because heating reduces any residual solvent. Particularly, when a minimum filming temperature (hereinafter may also be referred to as "MFT") of the resin particles is higher than 80° C., it is preferable to perform heating in terms of eliminating a film forming failure of the resin and improving image robustness.

Adjustment of the minimum filming temperature of the resin emulsion for obtaining the ink of the present invention can be achieved by controlling a glass transition temperature (hereinafter may also be referred to as "Tg") of the resin. When the resin particles are made of a copolymer, adjustment can be achieved by changing ratios of the monomers forming the copolymer. In the present invention, the minimum filming temperature refers to a lowest possible temperature at which a resin emulsion that is thinly cast over a metal plate such as aluminium forms a transparent continuous film as a result of temperature elevation, and refers to a point, in a temperature region lower than which the emulsion is in a white powder state. Specifically, the minimum filming temperature refers to a value measured with a commercially available minimum filming temperature measuring instrument such as "a filming temperature tester" (available from Imoto Machinery Co., Ltd.), "TP-801 MFT TESTER" (available from Tester Sangyo Co., Ltd.).

The minimum filming temperature changes also by control of the particle diameter of the resin. Therefore, it is possible to obtain an intended minimum filming temperature value based on these controllable factors.

<Color Material>

The color material is not particularly limited and may be appropriately selected depending on the intended purpose. Examples of the color material include pigments and dyes. Among these color materials, pigments are preferable.

Examples of the pigments include inorganic pigments and organic pigments.

Examples of the inorganic pigments include titanium oxide and iron oxide, calcium carbonate, barium sulfate, aluminium hydroxide, barium yellow, cadmium red, and chrome yellow, and in addition, carbon blacks produced by known methods such as a contact method, furnace method, and thermal method. One of these inorganic pigments may be used alone or two or more of these inorganic pigments may be used in combination.

Examples of the organic pigments include: azo-pigments (e.g., azo lake, insoluble azo-pigments, condensed azo-pigments, and chelate azo-pigments); polycyclic pigments (e.g., phthalocyanine pigments, perylene pigments, perionone pigments, anthraquinone pigments, quinacridone pigments, dioxazine pigments, indigo pigments, thioindigo pigments, isoindolinone pigments, and quinophthalone pigments); dye chelates (e.g., basic dye chelates and acid dye chelates); nitro pigments; nitroso pigments; and aniline black. One of these organic pigments may be used alone or two or more of these organic pigments may be used in combination.

Other usable examples of the pigments include resin hollow particles and inorganic hollow particles.

Among the above pigments, pigments having good affinity with a solvent are preferably used.

A content of the pigment is preferably greater than or equal to 0.1% by mass but less than or equal to 10% by mass and preferably greater than or equal to 1% by mass but less than or equal to 10% by mass of the total amount of the ink. When the content is greater than or equal to 0.1% by mass but less than or equal to 10% by mass, image density, fixability, and discharging stability can be improved.

Specific examples of the pigments for black include: carbon blacks (C.I. Pigment Black 7) such as furnace black, lamp black, acetylene black, and channel black; metals such as copper, iron (C.I. Pigment Black 11), and titanium oxide; and organic pigments such as aniline black (C.I. Pigment Black 1). One of these pigments may be used alone or two or more of these pigments may be used in combination.

Specific examples of the pigments for colors include: C. I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, and 155; C. I. Pigment Orange 5, 13, 16, 17, 36, 43, and 51; C. I. Pigment Red 1, 2, 3, 5, 17, 22, 23, 31, 38, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C. I. Pigment Violet 1 (Rhodamine Lake), 3, 5:1, 16, 19, 23, and 38; C. I. Pigment Blue 1, 2, 15 (Phthalocyanine blue), 15:1, 15:2, 15:3 (Phthalocyanine blue), 16, 17:1, 56, 60, and 63; and C. I. Pigment Green 1, 4, 7, 8, 10, 17, 18, and 36. One of these pigments may be used alone or two or more of these pigments may be used in combination.

It is possible to use a self-dispersible pigment that is made dispersible in water by addition of a functional group such as a sulfone group and a carboxyl group on a surface of the pigment (for example, carbon black).

It is also possible to use a pigment encapsulated in a microcapsule to be made dispersible in water, i.e., resin particles containing pigment particles.

In this case, there is no need that all of the pigment particles to be contained in the ink be encapsulated in or adsorbed to the resin particles, but the pigment may be dispersed in the ink in a range in which the effect of the present invention is not spoiled.

A number average particle diameter of the pigment is not particularly limited and may be appropriately selected depending on the intended purpose. However, a most frequent particle diameter based on a largest number of particles is preferably 20 nm or greater but 150 nm or less. A number average particle diameter of 20 nm or greater facilitates a dispersing operation and a classifying operation. A number average particle diameter of 150 nm or less is preferable because not only an improved pigment dispersion stability of the ink, but also an excellent discharging stability and improved image qualities such as image density will be obtained.

The number average particle diameter can be measured with, for example, a particle size analyzer (MICROTRAC MODEL UPA 9340 available from Nikkiso Co., Ltd.).

When a dispersing agent is used to disperse the pigment, the dispersing agent is not particularly limited and may be any known dispersing agent. Examples of the dispersing agent include polymeric dispersing agents and water-soluble surfactants. One of these dispersing agents may be used alone or two or more of these dispersing agents may be used in combination.

<Water>

The water is not particularly limited and may be appropriately selected depending on the intended purpose. Examples of the water include pure water and ultrapure water such as ion-exchanged water, ultrafiltrated water, reverse osmotic water, and distilled water. One of these kinds of water may be used alone or two or more of these kinds of water may be used in combination.

A content of the water is preferably greater than or equal to 15% by mass but less than or equal to 60% by mass and more preferably greater than or equal to 20% by mass but less than or equal to 40% by mass of the total amount of the ink. A content of greater than or equal to 15% by mass prevents viscosity thickening and improves discharging stability. A content of less than or equal to 60% by mass provides a favorable wettability into impermeable base materials and improves image qualities.

<Other Components>

Examples of the other components include a surfactant, an antiseptic-antifungal agent, an anti-rust agent, a pH regulator, and a colorless anti-aging agent such as hindered phenols and hindered phenolamines intended for rubbers and plastics.

-Surfactant-

The surfactant may be contained in order to ensure wettability into recording media.

The surfactant is not particularly limited and may be appropriately selected depending on the intended purpose. Examples of the surfactant includes amphoteric surfactants, nonionic surfactants, and anionic surfactants. One of these surfactants may be used alone or two or more of these surfactants may be used in combination. Among these surfactants, nonionic surfactants are preferable in terms of dispersion stability and image qualities.

Fluorosurfactants and silicone-based surfactants may also be used in combination or alone depending on the composition.

Examples of the nonionic surfactants include polyoxyethylene alkylphenylethers, polyoxyethylene alkyl esters, polyoxyethylene alkylamines, polyoxyethylene alkylamides, polyoxyethylene propylene block polymers, sorbitan fatty acid esters, polyoxyethylene sorbitan fatty acid esters, and acetylene alcohol/ethylene oxide adducts. One of these nonionic surfactants may be used alone or two or more of these nonionic surfactants may be used in combination.

A content of the surfactant is preferably greater than or equal to 0.1% by mass but less than or equal to 5% by mass. A content of greater than or equal to 0.1% by mass can ensure wettability into impermeable base materials and improve image qualities. A content of less than or equal to 5% by mass makes the ink hardly foamable and ensures an excellent discharging stability.

-Antiseptic-Antifungal Agent-

Examples of the antiseptic-antifungal agent include 1,2-benzisothiazolin-3-on, sodium benzoate, sodium dehydroacetate, sodium sorbate, sodium pentachlorophenol, and sodium 2-pyridinethiol-1-oxide. One of these antiseptic-antifungal agents may be used alone or two or more of these antiseptic-antifungal agents may be used in combination.

-Anti-Rust Agent-

Examples of the anti-rust agent include acidic sulfite, sodium thiosulfate, ammonium thiodiglycolate, diisopropyl ammonium nitrite, pentaerythritol tetranitrate, and dicyclohexyl ammonium nitrite. One of these anti-rust agents may be used alone or two or more of these anti-rust agents may be used in combination.

-pH Regulator-

The pH regulator is not particularly limited and may be any substance, so long as the substance does not adversely affect an ink, and can adjust pH of the ink to a desired value. Examples of the pH regulator include: hydroxides of alkali metal elements (e.g., lithium hydroxide, sodium hydroxide, and potassium hydroxide); carbonates of alkali metals (e.g., lithium carbonate, sodium carbonate, and potassium carbonate); quaternary ammonium hydroxide and amines (e.g., diethanolamine and triethanolamine); ammonium hydroxide; and quaternary phosphonium hydroxide. One of these pH regulators may be used alone or two or more of these pH regulators may be used in combination.

<Method for Producing Ink>

As a method for producing the ink, the ink can be produced by stirring and mixing the water, the organic solvent, the resin particles, and the color material, and as needed, the other components. The stirring and mixing may use, for example, a sand mill, a homogenizer, a ball mill, a paint shaker, an ultrasonic disperser, a stirrer using a typical stirring blade, a magnetic stirrer, and a high-speed disperser.

A viscosity of the ink is preferably 2 mPa·s or higher and more preferably 3 mPa·s or higher but 20 mPa·s or lower at 25° C. in terms of image qualities such as a quality level of letters recorded over a base material. A viscosity of 2 mPa·s or higher can improve discharging reliability.

<Ink Cartridge>

An ink cartridge used in the present invention includes the ink of the present invention and a container storing the ink.

The ink cartridge includes the ink and the container storing the ink, and further includes other members, etc. appropriately selected as needed.

The container is not particularly limited and may be of any shape, any structure, any size, any material, etc. that may be appropriately selected depending on the intended purpose. Examples of the container include a container including at least an ink bag made of, for example, an aluminium laminate film and a resin film.

(Inkjet Recording Method and Inkjet Recording Apparatus).

An inkjet recording apparatus of the present invention includes at least an ink flying unit and a heating unit and further includes other units appropriately selected as needed.

An inkjet recording method of the present invention includes at least an ink flying step and a heating step and further includes other steps appropriately selected as needed.

The inkjet recording method of the present invention can be favorably performed by the inkjet recording apparatus of the present invention. The ink flying step can be favorably performed by the ink flying unit. The heating step can be favorably performed by the heating unit. The other steps can be favorably performed by the other units.

<Ink Flying Step and Ink Flying Unit>

The ink flying step is a step of applying a stimulus to the inkjet ink of the present invention to fly the ink and form an image over a base material, and can be performed by the ink flying unit.

The ink flying unit is not particularly limited and may be appropriately selected depending on the intended purpose. Examples of the ink flying unit include an inkjet head.

Examples of the inkjet head includes a piezo inkjet head (see Japanese Examined Patent Publication No. 02-51734) using a piezoelectric element as a pressure generating unit to pressurize an ink in an ink flow path to deform a vibration plate constituting a wall surface of the ink flow path and change the internal cubic capacity of the ink flow path to discharge ink droplets, a thermal inkjet head (see Japanese Examined Patent Publication No. 61-59911) using a heating resistor to heat an ink in an ink flow path and generate bubbles, and an electrostatic inkjet head (see Japanese Unexamined Patent Application Publication No. 06-71882) using a vibration plate constituting a wall surface of an ink flow path and an electrode disposed counter to the vibration plate to deform the vibration plate by the effect of an electrostatic force generated between the vibration plate and the electrode and change the internal cubic capacity of the ink flow path to discharge ink droplets.

The stimulus can be generated by, for example, a stimulus generating unit. The stimulus is not particularly limited and may be appropriately selected depending on the intended purpose. Examples of the stimulus include heat (temperature), pressure, vibration, and light. One of these stimuli may be used alone or two or more of these stimuli may be used in combination. Among these stimuli, heat and pressure are preferable.

A method for flying the ink is not particularly limited and is different depending on the kind of the stimulus, etc. For example, when the stimulus is "heat", there is a method using, for example, a thermal head for applying a thermal energy corresponding to a recording signal to the ink in a recording head to generate bubbles in the ink by the thermal energy and discharge and jet the ink from nozzle holes of the recording head in a form of liquid droplets by a pressure of the bubbles. When the stimulus is "pressure", there is a method for, for example, applying a voltage to a piezoelectric element bonded to a position called a pressure chamber present in an ink flow path in a recording head to flex the piezoelectric element and shrink the cubic capacity of the pressure chamber to discharge and jet the ink from nozzle holes of the recording head in a form of liquid droplets.

A size of the liquid droplets of the ink to be flown is preferably 3 pl or greater but 40 pl or less. A discharging/jetting speed of the liquid droplets of the ink is preferably 5 m/s or higher but 20 m/s or lower. A driving frequency for flying the liquid droplets of the ink is preferably 1 kHz or higher. A resolution of the liquid droplets of the ink is preferably 300 dpi or higher.

<Base Material>

The base material is not particularly limited and may be appropriately selected depending on the intended purpose. Examples of the base material include permeable base materials and impermeable base materials. Among these base materials, impermeable base materials are preferable.

Examples of the permeable base materials include plain paper, synthetic paper, and cloth.

The impermeable base materials refer to base materials having a surface low in at least one of water permeability, absorbability, and adsorptivity. The impermeable base materials encompass also materials including many voids inside but unopened to the outside. More quantitatively, the impermeable base materials refer to base materials that result in a water absorption amount, measured by a Bristow method, of 10 mL/m$^2$ or less when 30 msec$^{1/2}$ has passed from a start of contact.

Examples of the impermeable base materials include polyvinyl chloride (PVC) films, polyethylene terephthalate (PET) films, polycarbonate films, and polyethylene films. Among these impermeable base materials, PVC films and PET films are preferable. Preferable among the impermeable base materials are impermeable base materials having a resin coating layer because recording on various kinds of base materials can be processed with one ink. The resin coating layer is preferably an acrylic resin coating layer in terms of fixability, affinity with a solvent, and robustness.

<Heating Step and Heating Unit>

The heating step is a step of heating a base material having a recorded image and can be performed by the heating unit.

The inkjet recording method is capable of applying a high-quality image recording over an impermeable base material, which is the base material. However, to be capable of forming an image with higher image qualities, a higher scratch resistance, and a higher close adhesiveness and accommodating high-speed recording conditions, it is preferable that the inkjet recording method heat the impermeable base material after recording. The heating step, if provided after recording, promotes the resin contained in the ink to form a film. This can improve an image hardness of a recorded matter.

The heating unit may be any of many known devices. Examples of the heating unit include devices for, for example, forced-air heating, radiation heating, conduction heating, high-frequency drying, and microwave drying. One of these heating units may be used alone or two or more of these heating units may be used in combination.

A temperature for the heating may be varied depending on the kind and amount of a water-soluble solvent contained in the ink and a minimum filming temperature of the resin emulsion added, and may also be varied depending on the kind of the base material to be printed.

The temperature for the heating is preferably high, more preferably 40° C. or higher but 120° C. or lower, and particularly preferably 50° C. or higher but 90° C. or lower in terms of driability and a filming temperature. When the temperature for the heating is 40° C. or higher but 120° C. or lower, it is possible to prevent the impermeable base material from being damaged by heat and to suppress blank discharging due to warming of an ink head.

<Other Steps and Other Units>

Examples of the other steps include a stimulus generating step and a controlling step.

Examples of the other units include a stimulus generating unit and a controlling unit.

Examples of the stimulus generating unit include heating devices, pressure devices, piezoelectric elements, vibration generating devices, ultrasonic oscillators, and lights. Specific examples of the stimulus generating unit include: a piezoelectric actuator such as a piezoelectric element; a thermal actuator that uses a thermoelectric transducer such as a heat element and utilizes phase change caused by film boiling of a liquid; a shape memory alloy actuator that utilizes a metal phase change caused by a temperature change; and an electrostatic actuator that utilizes electrostatic force.

The controlling unit is not particularly limited and may be appropriately selected depending on the intended purpose so long as the controlling unit is capable of controlling the operations of each unit. Examples of the controlling unit include devices such as a sequencer and a computer.

An example of the inkjet recording method of the present invention may be a recording method including a step of applying a clear ink free of a pigment or an ink (white ink) containing a white-color (white) pigment as a colorant over a base material and a recording step of performing recording using an ink containing a pigment. The clear ink or the white ink may be applied over a full surface of a recording medium or may be applied over a part of the recording medium. In application over a part of the recording medium, for example, the clear ink or the white ink may be applied over the same portion to which recording will be applied, or may be applied over a portion that partially overlaps with a portion to which recording will be applied.

In using the white ink, a recording method described below may be effective. The white ink is applied over a base material, and an ink having any other color than white is recorded over the white ink. This method can ensure visibility of the recording even over a transparent film, because the white ink of the present invention is attached over the surface of the recording medium. The ink of the present invention has a favorable driability, a high gloss, scratch resistance, etc. even over impermeable base materials. This allows for applying the white ink over impermeable base materials such as transparent films to improve visibility.

Applying the white ink after performing recording over a transparent film also makes it possible to obtain an image likewise excellent in visibility. The clear ink applied instead of the white ink can function as a protective layer.

The ink of the present invention is not limited to an inkjet recording method, but may be used for a broad range of methods. Examples of recording methods other than the inkjet recording method include a blade coating method, a gravure coating method, a gravure offset coating method, a bar coating method, a roll coating method, a knife coating method, an air knife coating method, a comma coating method, a U-comma coating method, an AKKU coating method, a smoothing coating method, a microgravure coating method, a reverse roll coating method, a 4- or 5-roll coating method, a dip coating method, a curtain coating method, a slide coating method, a die coating method, and a spray coating method.

An example mode may be performed by using an applying method other than an inkjet recording method when applying the white ink over a full surface of a recording medium and using an inkjet recording method when performing recording with an ink having any other color than white.

Another possible mode may be performed by using an inkjet recording method for performing both of recording with a white ink and recording with an ink having any other color than white.

The same applies to cases when the clear ink is used instead of the white ink.

An inkjet recording apparatus which can perform recording using the ink described above will be described with reference to figures. Note that, the case where an impermeable base material is used will be described, but permeable base materials such as paper can also be used for recording. The inkjet recording apparatus includes a serial type (shuttle type) inkjet recording apparatus in which carriage is used for scanning, and a line type inkjet recording apparatus which contains a line type head. FIG. 1 is a schematic view illustrating one example of a serial type inkjet recording apparatus. FIG. 2 is a schematic view illustrating a configuration in a main body of the apparatus of FIG. 1.

As illustrated in FIG. 1, this inkjet recording apparatus contains an apparatus main body 101, a paper feeding tray 102 provided in the apparatus main body 101, a paper ejecting tray 103, and an ink cartridge loading section 104. On an upper surface of the ink cartridge loading section 104, a control section 105 such as operation keys and a display is provided. The ink cartridge loading section 104 has a front cover 115 that can be opened and closed for attaching or detaching an ink cartridge 201. The reference numeral 111 denotes a head cover, and 112 denotes a front surface of the front cover.

In the apparatus main body 101, as illustrated in FIG. 2, a carriage 133 is slidably held in a main-scanning direction by a guide rod 131, which is a guide member laterally bridged between left and right side plates (not illustrated), and a stay 132, and is moved for scanning by a main scanning motor (not illustrated).

A recording head 134 including four inkjet recording heads configured to discharge ink droplets of yellow (Y), cyan (C), magenta (M) and black (Bk) is installed in the carriage 133 such that a plurality of ink discharging outlets are aligned in the direction intersecting the main-scanning direction and that the ink droplet discharging direction faces downward.

For each of the inkjet recording heads constituting the recording head 134, it is possible to use, for example, a head provided with any of the following units configured to generate energy for discharging ink: a piezoelectric actuator such as a piezoelectric element, a thermal actuator that uses a thermoelectric transducer such as a heat element and utilizes phase change caused by film boiling of a liquid, a shape memory alloy actuator that utilizes a metal phase change caused by a temperature change, and an electrostatic actuator that utilizes electrostatic force.

Also, the carriage 133 is provided with sub-tanks 135 for each color configured to supply each color ink to the recording head 134. Each sub-tank 135 is supplied and replenished with the ink from the ink cartridge 201 of the present invention loaded into the ink cartridge loading section 104, via an ink supply tube (not illustrated).

Meanwhile, as a paper feeding section for feeding a base material 142 loaded on a base material loading section (pressure plate) 141 of the paper feeding tray 102, there are provided a half-moon roller (paper feeding roller 143) configured to feed the base material 142 one by one from the base material loading section 141, and a separation pad 144 which faces the paper feeding roller 143 and is made of a material with a large friction coefficient. This separation pad 144 is biased toward the paper feeding roller 143 side.

As a conveyance section for conveying the base material 142, which has been fed from this paper feeding section, under the recording head 134, there are provided a conveyance belt 151 for conveying the base material 142 by means of electrostatic adsorption; a counter roller 152 for conveying the base material 142, which is sent from the paper feeding section via a guide 145, while the base material is sandwiched between the counter roller and the conveyance belt 151; a conveyance guide 153 for making the base material 142, which is sent upward in the approximately vertical direction, change direction by approximately 90° and thus run along the conveyance belt 151; and an end pressurizing roller 155 biased toward the conveyance belt 151 side by a pressing member 154. Also, there is provided a charging roller 156 serving as a charging unit configured to charge a surface of the conveyance belt 151.

The conveyance belt 151 is an endless belt; and is capable of rotating around in a belt conveyance direction by stretching between a heater type conveyance roller 157 and a tension roller 158. The conveyance belt 151 has, for example, a surface layer serving as a surface for adsorbing a base material and made of a resinous material for which resistance control has not been conducted and that has a thickness of approximately 40 µm, such as ethylene-tetrafluoroethylene copolymer (ETFE); and a back layer (intermediate resistance layer, ground layer) which is made of the same material as the surface layer, and for which resistance control has been conducted using carbon. On the back of the conveyance belt 151, a heater type guide member 161 is disposed correspondingly to a region where printing is performed by the recording head 134. Additionally, as a paper ejecting section for ejecting the base material 142 on which images have been recorded by the recording head 134, there are provided a separation claw 171 for separating the base material 142 from the conveyance belt 151, a paper ejecting roller 172, and a paper ejecting roller 173. The base material 142 is subjected to hot-air drying by means of a fan heater (not illustrated), followed by being output to the paper ejecting tray 103 placed below the paper ejecting roller 172.

A double-sided paper feeding unit 181 is detachably mounted on a rear surface portion of the apparatus main body 101. The double-sided paper feeding unit 181 takes in the base material 142 returned by rotation of the conveyance belt 151 in the opposite direction and reverses the base material, then refeeds the base material between the counter roller 152 and the conveyance belt 151. Additionally, a manual paper feeding section 182 is provided on an upper surface of the double-sided paper feeding unit 181.

In the inkjet recording apparatus, the base material 142 is fed one by one from the paper feeding section, and the base material 142 fed upward in the approximately vertical direction is guided by the guide 145 and conveyed with being sandwiched between the conveyance belt 151 and the counter roller 152. Further, an end of the base material is guided by the conveyance guide 153 and pressed onto the conveyance belt 151 by the end pressurizing roller 155, so that the conveyance direction of the base material is changed by approximately 90°. On this occasion, the conveyance belt 151 is charged by the charging roller 156, and the base material 142 is electrostatically adsorbed onto the conveyance belt 151 and thusly conveyed.

Here, by driving the recording head 134 according to an image signal while moving the carriage 133, ink droplets are discharged onto the base material 142 having stopped so as to perform recording for one line. Then, the base material 142 is conveyed by a predetermined distance, and then recording for the next line is performed. On receipt of a recording completion signal or a signal indicating that a rear end of the base material 142 has reached a recording region, recording operation is finished, and the base material 142 is ejected onto the paper ejecting tray 103.

FIG. 3 is a schematic view illustrating an example of the heating unit of the inkjet recording apparatus illustrated in FIG. 1 and FIG. 2. The heating unit of FIG. 3 is configured to be capable of drying an image formed over the base material 142 conveyed over the conveyance belt 151 by blowing the image with hot air 202 by means of a heating fan 201 which is a hot air generating unit.

A group of heaters 203 are provided at a side of the conveyance belt 151 opposite to the side at which the base material 142 is present and are capable of heating the base material 142 over which an image has been formed. In FIG. 3, the reference numerals 157 and 158 denote conveyance rollers which are a conveyance unit.

(Recorded Matter)

A recorded matter of the present invention includes a base material and an image recorded over the base material with the ink of the present invention.

The base material may be the same base material as used in the inkjet recording method and inkjet recording apparatus. However, the ink of the present invention can provide an image having a favorable chromogenic property even when applied over an impermeable base material.

Further, in color recording over a base material having a color (i.e., a colored base material), application of a white ink before a color ink can make the base material uniformly colored in white and improve a chromogenic property of the color ink. Examples of the colored base material include colored paper, the aforementioned films that are colored, colored cloth, colored clothes, and colored ceramics.

EXAMPLES

The present invention will be described below by way of Examples. However, the present invention should not be construed as being limited to the Examples.

Preparation Example 1 for Preparing Resin Particles

<Preparation of Polycarbonate Polyurethane Resin Emulsion>

A reaction vessel equipped with a stirrer, a reflux condenser, and a thermometer was charged with 1,500 g of polycarbonate diol (reaction product of 1,6-hexanediol and dimethyl carbonate (number average molecular weight (Mn): 1,200)), 220 g of 2,2-dimethylol propionic acid (hereinafter may also be referred to as "DMPA"), and 1,347 g of N-methylpyrrolidone (hereinafter may also be referred to as "NMP") under a nitrogen gas stream, followed by heating to 60° C. to dissolve DMPA.

Then, 1,445 g of 4,4'-dicyclohexylmethane diisocyanate and 2.6 g of dibutyl tin dilaurate (catalyst) were added to the resultant, followed by heating to 90° C. to allow to urethanize for 5 hours, to obtain an isocyanate-terminated urethane prepolymer. Then, the resultant reaction mixture was cooled to 80° C. To the resultant, 149 g of triethylamine was added and mixed together, and 4,340 g out of the resultant mixture was taken out and added to a mixed solution of 5,400 g of water and 15 g of triethylamine with strong stirring.

Then, 1,500 g of ice and 626 g of a 35% by mass solution of 2-methyl-1,5-pentanediamine in water were added to the resultant to allow for a chain elongation reaction. Solvents were distilled off so as to give a solid content of 30% by mass, to obtain a polycarbonate polyurethane resin emulsion 1.

The obtained polycarbonate polyurethane resin emulsion 1 was measured with "a filming temperature tester" (available from Imoto Machinery Co., Ltd.). As a result, a minimum filming temperature was 55° C.

Preparation Example 2 for Preparing Resin Particles

<Preparation of Polyether Polyurethane Resin Emulsion>

A reaction was induced in a vessel equipped with a thermometer, a nitrogen gas introducing tube, and a stirrer and purged with nitrogen, using 100.2 parts by mass of polyether polyol ("PTMG1000" available from Mitsubishi Chemical Corporation, volume average molecular weight: 1,000), 15.7 parts by mass of 2,2-dimethylol propionic acid, 48.0 parts by mass of isophorone diisocyanate, 77.1 parts by mass of methyl ethyl ketone as an organic solvent, and 0.06 parts by mass of dibutyl tin dilaurate as a catalyst.

The reaction was continued for 4 hours. Then, 30.7 parts by mass of methyl ethyl ketone as a dilute solution was supplied to further continue the reaction.

When a weight average molecular weight of the reaction product reached a range of 20,000 or greater but 60,000 or less, 1.4 parts by mass of methanol was supplied to terminate the reaction, to obtain an organic solvent solution of a urethane resin. Thirteen point four parts by mass of a 48% by mass potassium hydroxide aqueous solution was added to the organic solvent solution of the urethane resin to neutralize carboxyl groups of the urethane resin. Then, 715.3 parts by mass of water was added, and the resultant was stirred sufficiently, aged, and desolventized, to obtain a polyether polyurethane resin emulsion 2 having a solid content of 30% by mass.

A minimum filming temperature of the obtained polyether polyurethane resin emulsion 2 measured in the same manner as in Preparation Example 1 for the polycarbonate polyurethane resin emulsion was 43° C.

Preparation Example 3 for Preparing Resin Particles

<Preparation of Polyester Polyurethane Resin Emulsion>

A polyester polyurethane resin emulsion 3 having a solid content of 30% by mass was obtained in the same manner as in Preparation Example 2 for preparing resin particles, except that the polyether polyol ("PTMG1000" available from Mitsubishi Chemical Corporation, volume average molecular weight: 1,000) used in Preparation Example 2 for preparing resin particles was changed to polyester polyol ("POLYLITE OD-X-2251" available from DIC Corporation, volume average molecular weight: 2,000).

A minimum filming temperature of the obtained polyester polyurethane resin emulsion 3 measured in the same manner as in Preparation Example 1 for the polycarbonate polyurethane resin emulsion was 74° C.

Preparation Example 1 for Preparing Pigment Dispersion Liquid

<Preparation of Black Pigment Dispersion Liquid>

A prescribed mixture of the followings was pre-mixed and subjected to circulation dispersion with a disk-type bead mill (KDL TYPE available from Shinmaru Enterprises Corporation, media used: zirconia balls with a diameter of 0.3 mm) for 7 hours, to obtain a black pigment dispersion liquid (with a pigment solid content of 15% by mass).

Carbon black pigment (product name: MONARCH 800 available from Cabot Corporation)—15 parts by mass Anionic surfactant (PIONINE A-51-B available from Takemoto Oil & Fat Co., Ltd.)—2 parts by mass Ion-exchanged water—83 parts by mass

Preparation Example 2 for Preparing Pigment Dispersion Liquid

<Preparation of Cyan Pigment Dispersion Liquid>

A cyan pigment dispersion liquid (with a pigment solid content of 15% by mass) was obtained in the same manner as in Preparation Example 1 for preparing pigment dispersion liquid, except that the carbon black pigment used in Preparation Example 1 for preparing pigment dispersion liquid was changed to a Pigment blue 15:3 (product name: LIONOL BLUE FG-7351 available from Toyo Ink Co., Ltd.).

Preparation Example 3 for Preparing Pigment Dispersion Liquid

<Preparation of Magenta Pigment Dispersion Liquid>

A magenta pigment dispersion liquid (with a pigment solid content of 15% by mass) was obtained in the same manner as in Preparation Example 1 for preparing pigment dispersion liquid, except that the carbon black pigment used in Preparation Example 1 for preparing pigment dispersion liquid was changed to a Pigment red 122 (product name: TONER MAGENTA E002 available from Clamant (Japan) K.K.).

Preparation Example 4 for Preparing Pigment Dispersion Liquid

<Preparation of Yellow Pigment Dispersion Liquid>

A yellow pigment dispersion liquid (with a pigment solid content of 15% by mass) was obtained in the same manner as in Preparation Example 1 for preparing pigment dispersion liquid, except that the carbon black pigment used in Preparation Example 1 for preparing pigment dispersion liquid was changed to a Pigment yellow 74 (product name: FAST YELLOW 531 available from Dainichiseika Color & Chemicals Mfg. Co., Ltd.).

Preparation Example 5 for Preparing Pigment Dispersion Liquid

<Preparation of Resin-Dispersed Black Pigment Dispersion Liquid>

-Preparation of Polymer Solution A-

A 1 L flask equipped with a mechanical stirrer, a thermometer, a nitrogen gas introducing tube, a reflux condenser, and a dropping funnel was sufficiently internally purged with a nitrogen gas. Then, 11.2 g of styrene, 2.8 g of acrylic acid, 12.0 g of lauryl methacrylate, 4.0 g of polyethylene glycol methacrylate, 4.0 g of a styrene macromer (product name: AS-6 available from Toagosei Co., Ltd.), and 0.4 g of mercaptoethanol were mixed and heated to 65° C. in the flask. Then, a mixture solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of the styrene macromer mentioned above, 3.6 g of mercaptoethanol, 2.4 g of azobis methylvaleronitrile, and 18.0 g of methyl ethyl ketone was dropped into the flask in 2.5 hours. After the dropping, a mixture solution of 0.8 g of azobis methylvaleronitrile and 18.0 g of methyl ethyl ketone was dropped into the flask in 0.5 hours. After the resultant was aged at 65° C. for 1 hour, 0.8 g of azobis methylvaleronitrile was added and the resultant was further aged for 1 hour. After the reaction completed, 364.0 g of methyl ethyl ketone was added into the flask to obtain 800 g of a polymer solution A having a solid content of 50% by mass.

-Preparation of Black Pigment Dispersion Liquid-

Twenty-eight grams of the polymer solution A, 42 g of carbon black (FW100 available from Degussa Ag), 13.6 g of a 1 mol/L potassium hydroxide aqueous solution, 20 g of methyl ethyl ketone, and 13.6 g of water were stirred sufficiently and then kneaded with a roll mill. The obtained paste was put into 200 g of pure water, stirred sufficiently, and evacuated of methyl ethyl ketone and water by distillation with an evaporator. Then, to remove coarse particles, the resultant dispersion liquid was subjected to pressure filtration through a polyvinylidene fluoride membrane filter having an average pore diameter of 5.0 μm, to obtain a carbon black pigment-containing polymer particle dispersion having a pigment solid content of 15% by mass and a solid content of 20% by mass.

Example 1

<Preparation of Ink>

Twenty percent by mass of the black pigment dispersion liquid of Preparation Example 1 (with a pigment solid content of 15% by mass), 30% by mass of the polycarbonate polyurethane resin emulsion of Preparation Example 1 (with a solid content of 30% by mass), 11% by mass of 3-methoxy-N,N-dimethylpropionamide (product name: EQUAMIDE M-100 available from Idemitsu Kosan Co., Ltd.), 21% by mass of 1,2-propanediol, 4% by mass of 3-methoxy-3-methyl-1-butanol, 0.1% by mass of an antiseptic with a product name: PROXEL LV (available from Arch Chemicals Japan, Inc.), 0.01% by mass of a fluorosurfactant (product name: UNIDYNE DSN-403N available from Daikin Industries, Ltd.), and a balance amount of highly pure water (100% by mass in total) were mixed and stirred, and then subjected to filtration through a polypropylene filter having an average pore diameter of 0.2 μm, to produce an ink of Example 1.

Examples 2 to 9 and Comparative Examples 1 to 4

<Preparation of Inks>

Inks of Examples 2 to 9 and Comparative Examples 1 to 4 were produced in the same manner as in Example 1, except that the composition and contents used in Example 1 were changed to the composition and contents presented in Table 1 to Table 3.

TABLE 1

|  | Component name | Ex. 1 | Ex. 2 | Ex. 3 | Ex. 4 | Ex. 5 |
|---|---|---|---|---|---|---|
| Pigment dispersion liquid | Blade pigment dispersion liquid of Preparation Example 1 | 20 | 20 | — | — | — |
|  | Cyan pigment dispersion liquid of Preparation Example 2 | — | — | — | — | 20 |
|  | Magena pigment dispersion liquid of Preparation Example 3 | — | — | 20 | — | — |
|  | Yellow pigment dispersion liquid of Preparation Example 4 | — | — | — | 20 | — |
|  | Resin-dispersed black pigment dispersion liquid of Preparation Example 5 | — | — | — | — | — |
| Resin particles | Polycarbonate polyurethane resin emulsion 1 of Preparation Example 1 | 30 | — | 30 | — | — |
|  | Polyether polyurethane resin emulsion 2 of Preparation Example 2 | — | 30 | — | 30 | — |
|  | Polyester polyurethane resin emulsion 3 of Preparation Example 3 | — | — | — | — | 25 |
|  | Polyester resin emulsion (PESRESIN A-124GP: Takamatsu Oil&Fat Co., Ltd.) | — | — | — | — | — |

TABLE 1-continued

|  |  | Component name | Ex. 1 | Ex. 2 | Ex. 3 | Ex. 4 | Ex. 5 |
|---|---|---|---|---|---|---|---|
|  |  | Ethylene-vinyl chloride copolymer emulsion (SUMIELITE 1210: Sumika Chemtex Co., Ltd.) | — | — | — | — | — |
| Organic solvent | A | 3-methoxy-N,N-dimethyl propionamide | 11 | — | — | — | — |
|  |  | 3-butoxy-N,N-dimethyl propionamide | — | 8 | — | — | — |
|  |  | Diethylene glycol diethylether | — | — | 11 | — | — |
|  |  | Dibenzylether | — | — | — | 3 | — |
|  |  | Tetramethylurea | — | — | — | — | 18 |
|  |  | 2-pyrrolidone | — | — | — | — | — |
|  |  | 1-n-octyl-2-pyrrolidon | — | — | — | — | — |
|  |  | 1,3-dimethyl-2-imidazolidinone | — | — | — | — | — |
|  | B | 1,2-propanediol | 21 | 18 | 5 | — | — |
|  |  | 1,3-propanediol | — | 1 | — | 21 | — |
|  |  | 1,2-butanediol | — | — | 10 | — | 15 |
|  |  | 2,3-butanediol | — | — | — | — | — |
|  | C | 3-methoxy-3-methyl-1-butanol | 4 | 4 | — | 2 | 2 |
|  | D | 2-methyl-2,4-pentanediol | — | 1 | 2 | — | — |
|  |  | Dipropylene glycol monomethylether | — | — | 1 | 3 | — |
| Antiseptic |  | PROXEL LV | 0.1 | 0.1 | 0.1 | 0.1 | 0.1 |
| Surfactant |  | Fluorosurfactant | 0.01 | 0.01 | 0.01 | 0.01 | 0.01 |
| Water |  | Highly pure water | Balance | Balance | Balance | Balance | Balance |
|  |  | Total (% by mass) | 100 | 100 | 100 | 100 | 100 |
|  |  | Total content of organic solvent (% by mass) | 11 | 8 | 11 | 8 | 35 |
|  |  | Ratio of organic solvent A to total content of organic solvent (% by mass) | 31 | 25 | 38 | 10.3 | 51.4 |

TABLE 2

|  |  | Component name | Ex. 6 | Ex. 7 | Ex. 8 | Ex. 9 |
|---|---|---|---|---|---|---|
| Pigment dispersion liquid |  | Black pigment dispersion liquid of Preparation Example 1 | — | 20 | 18 | — |
|  |  | Cyan pigment dispersion liquid of Preparation Example 2 | — | — | — | — |
|  |  | Magenta pigment dispersion liquid of Preparation Example 3 | — | — | — | 20 |
|  |  | Yellow pigment dispersion liquid of Preparation Example 4 | — | — | — | — |
|  |  | Resin-dispersed black pigment dispersion liquid of Preparation Example 5 | 22 | — | — | — |
| Resin particles |  | Polycarbonate polyurethane resin emulsion 1 of Preparation Example 1 | 25 | — | — | — |
|  |  | Polyether polyurethane resin emulsion 2 of Preparation Example 2 | — | — | — | — |
|  |  | Polyester polyurethane resin emulsion 3 of Preparation Example 3 | — | — | — | 30 |
|  |  | Polyster resin emulsion (PESRESIN A-124GP: Takamatsu Oil&Fat Co., Ltd.) | — | 30 | — | — |
|  |  | Ethylene-vinyl chloride copolymer emulsion (SUMIELITE 1210: Sumika Chemtex Co., Ltd.) | — | — | 20 | — |
| Organic solvent | A | 3-methoxy-N,N-dimethyl propionamide | — | — | — | 5 |
|  |  | 3-butoxy-N,N-dimethyl propionamide | — | — | — | — |
|  |  | Diethylene glycol diethylether | — | — | — | 4 |
|  |  | Dibenzylether | — | — | — | — |
|  |  | Tetramethylurea | — | — | — | — |
|  |  | 2-pyrrolidone | 3 | — | — | — |
|  |  | 1-n-octyl-2-pyrrolidon | — | 15 | — | — |
|  |  | 1,3-dimethyl-2-imidazolidinone | — | — | 5 | — |
|  | B | 1,2-propanediol | 5 | — | 12 | 12 |
|  |  | 1,3-propanediol | 2 | — | 4 | 2 |
|  |  | 1,2-butanediol | — | — | 4 | 8 |
|  |  | 2,3-butanediol | 20 | 10 | 4 | 2 |
|  | C | 3-methoxy-3-methyl-1-butanol | 2 | 6 | 2 | 2 |
|  | D | 2-methyl-2,4-pentanediol | 2 | 2 | — | — |
|  |  | Dipropylene glycol monomethylether | 2 | — | 2 | 1 |

TABLE 2-continued

|  | Component name | Ex. 6 | Ex. 7 | Ex. 8 | Ex. 9 |
|---|---|---|---|---|---|
| Antiseptic | PSOXEL LV | 0.1 | 0.1 | 0.1 | 0.1 |
| Surfactant | Fluorosurfactant | 0.01 | 0.01 | 0.01 | 0.01 |
| Water | Highly pure water | Balance | Balance | Balance | Balance |
| | Total (% by mass) | 100 | 100 | 100 | 100 |
| | Total content of organic solvent (% by mass) | 36 | 33 | 33 | 31 |
| | Ratio of organic solvent A to total content of organic solvent (% by mass) | 8.3 | 45.5 | 15.2 | 29 |

TABLE 3

|  |  | Component name | Comp. Ex. 1 | Comp. Ex. 2 | Comp. Ex. 3 | Comp. Ex. 4 |
|---|---|---|---|---|---|---|
| Pigment dispersion liquid | | Black pigment dispersion liquid of Preparation Example 1 | 20 | 20 | 20 | 20 |
| Resin particles | | Polycarbonate polyurethane resin emulsion 1 of Preparation Example 1 | 30 | 30 | 30 | 30 |
| Organic solvent | A | 3-butoxy-N,N-dimethyl propionamide | — | — | — | 8 |
| | Comparative component for A | Dimethyl sulfoxide | 5 | — | — | — |
| | | Acetone | — | 8 | — | — |
| | | Cyclohexylamine | — | — | 8 | — |
| | B | 1,2-propanediol | 10 | 12 | 12 | — |
| | | 1,3-propanediol | 2 | 1 | 1 | — |
| | | 1,2-butanediol | 2 | 1 | 1 | — |
| | | 2,3-butanediol | 1 | 2 | 2 | — |
| | C | 3-methoxy-3-methyl-1-butanol | — | — | — | — |
| | D | 2-methyl-2,4-pentanediol | 2 | 2 | 2 | 10 |
| | | Dipropylene glycol monomethylether | 1 | 3 | 3 | 10 |
| Antiseptic | | PROXEL LV | 0.1 | 0.1 | 0.1 | 0.1 |
| Surfactant | | Fluorosurfactant | 0.01 | 0.01 | 0.01 | 0.01 |
| Water | | Highly pure water | Balance | Balance | Balance | Balance |
| | | Total (% by mass) | 100 | 100 | 100 | 100 |
| | | Total content of organic solvent (% by mass) | 23 | 8 | 29 | 28 |
| | | Ratio of organic solvent A to total content of organic solvent (% by mass) | — | — | — | 28.6 |

-Resin Particles-
Polyester resin emulsion (PESRESIN A-124GP available from Takamatsu Oil & Fat Co., Ltd., with a solid content of 30% by mass)
Ethylene-vinyl chloride copolymer emulsion (SUMIELITE 1210 available from Sumika Chemtex Co., Ltd., with a solid content of 50% by mass)
-Organic Solvent a and Comparative Components for Organic Solvent A-
  3-Methoxy-N,N-dimethylpropionamide (product name: EQUAMIDE M100 available from Idemitsu Kosan Co., Ltd., δH: 4.1 MPa$^{1/2}$, Fh: 16%, boiling point: 216° C.)
  3-Butoxy-N,N-dimethylpropionamide (product name: EQUAMIDE B100 available from Idemitsu Kosan Co., Ltd., δH: 7.0 MPa$^{1/2}$, Fh: 17%, boiling point: 252° C.)
  Diethylene glycol diethylether (available from Tokyo Chemical Industry Co., Ltd., δH: 9.5 MPa$^{1/2}$, Fh: 25%, boiling point: 180° C.)
  Dibenzylether (available from Tokyo Chemical Industry Co., Ltd., δH: 7.4 MPa$^{1/2}$, Fh: 26%, boiling point: 298° C.)
  Tetramethylurea (available from Tokyo Chemical Industry Co., Ltd., δH: 8.1 MPa$^{1/2}$, Fh: 22%, boiling point: 177° C.)
  2-Pyrrolidone (available from Tokyo Chemical Industry Co., Ltd., δH: 5.2 MPa$^{1/2}$, Fh: 20%, boiling point: 245° C.)
  1-n-Octyl-2-pyrrolidone (available from Tokyo Chemical Industry Co., Ltd., δH: 8.4 MPa$^{1/2}$, Fh: 21%, boiling point: 170° C.)
  1,3-Dimethyl-2-imidazolidinone (available from Tokyo Chemical Industry Co., Ltd., δH: 6.7 MPa$^{1/2}$, Fh: 21%, boiling point: 224° C.)
  Dimethyl sulfoxide (available from Tokyo Chemical Industry Co., Ltd., δH: 10.2 MPa$^{1/2}$, Fh: 23%, boiling point: 189° C.)
  Acetone (available from Tokyo Chemical Industry Co., Ltd., δH: 7.0 MPa$^{1/2}$, Fh: 21%, boiling point: 56° C.)
  Cyclohexylamine (available from Tokyo Chemical Industry Co., Ltd., δH: 6.6 MPa$^{1/2}$, Fh: 24%, boiling point: 135° C.)
-Organic Solvent B-
  1,2-Propanediol (available from Tokyo Chemical Industry Co., Ltd., δH: 13.8 MPa$^{1/2}$, Fh: 35%, boiling point: 188° C.)
  1,3-Propanediol (available from Tokyo Chemical Industry Co., Ltd., δH: 14.0 MPa$^{1/2}$, Fh: 38%, boiling point: 211° C.)
  1,2-Butanediol (available from Tokyo Chemical Industry Co., Ltd., δH: 19.2 MPa$^{1/2}$, Fh: 43%, boiling point: 191° C.)

2,3-Butanediol (available from Tokyo Chemical Industry Co., Ltd., δH: 18.3 MPa$^{1/2}$, Fh: 43%, boiling point: 178° C.)

-Organic Solvent C-

3-Methoxy-3-methyl-1-butanol (available from Tokyo Chemical Industry Co., Ltd., δH: 12.6 MPa$^{1/2}$, Fh: 39%, boiling point: 174° C.)

-Organic Solvent D-

2-Methyl-2,4-pentanediol (available from Tokyo Chemical Industry Co., Ltd., δH: 15.0 MPa$^{1/2}$, Fh: 39%, boiling point: 197° C.)

Dipropylene glycol monomethylether (available from Tokyo Chemical Industry Co., Ltd., δH: 10.8 MPa$^{1/2}$, Fh: 31%, boiling point: 190° C.)

Fluorosurfactant (UNIDYNE DSN-403N available from Daikin Industries, Ltd.)

Antiseptic (PROXEL LV available from Arch Chemicals Japan, Inc.)

Next, the obtained inks of Examples 1 to 9 and Comparative Examples 1 to 4 were evaluated in "ink storage stability" and "discharging reliability" in the manners described below. The results are presented in Table 4.

<Ink Storage Stability>

Forty milliliters of each ink was enclosed in a glass vial bottle having a capacity of 50 mL and stored in a thermostat bath of 70° C. for 14 days. After the storage, a viscosity of the ink was measured, and a viscosity change rate (%) was calculated based on viscosities before and after the storage for 14 days. Ink storage stability was evaluated according to the evaluation criteria described below based on the obtained viscosity change rate. An evaluation of B or higher is desirable for practical use.

The viscosity was measured with a cone-plate viscometer DV-IP CP (available from EKO Instruments) at 25° C.

<Evaluation Criteria>

A: The viscosity change rate was 5% or lower.
B: The viscosity change rate was 6% or higher but 10% or lower.
C: The viscosity change rate was 11% or higher but 20% or lower.

<Discharging Reliability>

Discharging reliability was evaluated using an inkjet printer (a remodeled apparatus of IPSIO GXE5500 available from Ricoh Co., Ltd.). The remodeled apparatus of IPSIO GXE5500 was obtained by remodeling the IPSIO GXE5500 apparatus to be capable of reproducing a print corresponding to a printing speed of 30 m$^2$/hr at a printing width of 150 cm over an A4-size base material.

The inkjet printer was loaded with the ink of each of Examples 1 to 9 and Comparative Examples 1 to 4. After it was confirmed that there was no "nozzle disorder that would lead to an image void", the inkjet printer was left to stand for 12 hours. After the leaving to stand for 12 hours, a nozzle check pattern was printed over a base material, which was a polyvinyl chloride film including an acrylic resin coating layer (MPI3000 available from AVERY DENNISON Corporation, hereinafter may also be referred to as "PVC film"), without a cleaning maintenance. The number of "image voids by nozzle disorder" that occurred was counted, to evaluate "discharging reliability" according to the evaluation criteria described below. An evaluation of B or higher is desirable for practical use. Note that "an image void by nozzle disorder" refers to a failure to obtain a correctly drawn ink image due to a failure in ink discharging.

<Evaluation Criteria>

A: The number of image voids by nozzle disorder was 1 or less.
B: The number of image voids by nozzle disorder was 2 or less.
C: The number of image voids by nozzle disorder was 4 or less.
D: The number of image voids by nozzle disorder was 5 or more.

Next, with an inkjet printer (apparatus name: a remodeled apparatus of IPSIO GXE5500 available from Ricoh Co., Ltd.) loaded with each of the obtained inks of Examples 1 to 9 and Comparative Examples 1 to 4, a solid image was recorded over base materials, which were the "PVC film" mentioned above and a PET film including an acrylic resin coating layer (transparent PET, VIEWFUL TP-188 available from Kimoto Co., Ltd., hereinafter may also be referred to as "PET film"). After the solid image was recorded, the solid image was dried on a hot plate (a hot plate (NINOS ND-1 available from AS ONE Corporation)) set to 80° C. for 1 hour.

Note that the remodeled apparatus of IPSIO GXE5500 was obtained by remodeling the IPSIO GXE5500 apparatus to be capable of reproducing a print corresponding to a printing speed of 30 m$^2$/hr at a printing width of 150 cm over an A4-size base material. The remodeled apparatus was also remodeled to be mounted with the hot plate to be capable of changing heating conditions (a heating temperature and a heating time) after recording.

Each solid image generated was evaluated in "fixability (beading)", "non-transferability", and "scratch resistance" in the manners described below. The results are presented in Table 5.

The evaluation criteria employed for evaluation of "fixability (beading)", "non-transferability", and "scratch resistance" were much stricter than criteria for recording over ordinary paper, considering use for outdoor purposes.

<Fixability (Beading)>

Each solid image formed over the "PVC film" and the "PET film" was visually observed for any printing unevenness. "Fixability (beading)" was evaluated according to the evaluation criteria described below. An evaluation of B or higher is desirable for practical use.

<Evaluation Criteria>

A: Extraordinarily favorable (there was no beading at all).
B: Favorable (there was slight beading observed).
C: Ordinary (there was beading).
D: Bad (there was remarkable beading).

<Non-Transferability>

Two of the solid images formed over the "PVC film" and over the "PET film" were cut into a size of 3 cm by 3 cm. The two images were overlapped to contact each other, and a pressure of 1.0 MPa was applied onto the two images from above for 10 seconds with a press machine. Then, the two evaluation samples were stripped from each other. Here, ease of stripping was felt, and presence or absence of any damages in the images after the stripping was visually observed, to evaluate "non-transferability" according to the evaluation criteria described below. An evaluation of B or higher is desirable for practical use.

<Evaluation Criteria>

A: When the two solid images were stripped, there was no sense of stickiness and the solid images stripped naturally with no color transfer between the base materials of the solid images.

B: When the two solid images were stripped, there was a slight sense of stickiness, but there were no damages in the images.

C: When the two solid images were stripped, there was a sense of stickiness, and there were mild damages in the images.

D: When the two solid images were stripped, there was a strong sense of stickiness, and there were remarkable damages in the images.

<Scratch Resistance>

Each solid image formed over the "PVC film" and the "PET film" was scratched with dry cotton (calico No. 3) under a load of 400 g, to visually observe the conditions of the image and evaluate "scratch resistance" according to the evaluation criteria described below. An evaluation of B or higher is desirable for practical use.

<Evaluation Criteria>

AA: The image had not changed even after 50 times or more of scratching.

A: After 50 times of scratching, there had been no impact in the image density although there were some abrasions.

B: The image density had degraded during scratching given at a $31^{st}$ time or greater but $50^{th}$ time or less.

C: The image density had degraded during scratching given at a $30^{th}$ time or less.

TABLE 4

| | Specific organic solvent A and comparative component for organic solvent A | | | Ink | |
|---|---|---|---|---|---|
| | δH (MPa$^{1/2}$) | Boiling point (° C.) | Fh (%) | storage stability | Discharging reliability |
| Ex. 1 | 4.11 | 216 | 16 | A | A |
| Ex. 2 | 7.0 | 252 | 17 | A | A |
| Ex. 3 | 9.5 | 180 | 25 | B | A |
| Ex. 4 | 7.4 | 298 | 26 | A | B |
| Ex. 5 | 8.1 | 177 | 22 | B | A |
| Ex. 6 | 5.2 | 245 | 20 | A | B |
| Ex. 7 | 8.4 | 170 | 21 | A | B |
| Ex. 8 | 6.7 | 224 | 21 | B | B |
| Ex. 9 | 4.1 | 216 | 16 | A | A |
| | 9.5 | 180 | 25 | | |
| Comp. Ex. 1 | 10.2 | 189 | 23 | A | B |
| Comp. Ex. 2 | 7.0 | 56 | 21 | C | D |
| Comp. Ex. 3 | 6.6 | 133 | 24 | B | D |
| Comp. Ex. 4 | 7.0 | 252 | 17 | C | C |

TABLE 5

| | Fixability | | Non-transferability | | Scratch resistance | |
|---|---|---|---|---|---|---|
| | PVC film | PET film | PVC film | PET film | PVC film | PET film |
| Ex. 1 | A | B | A | B | AA | AA |
| Ex. 2 | A | B | B | B | AA | AA |
| Ex. 3 | A | B | A | B | A | A |
| Ex. 4 | B | C | B | C | AA | AA |
| Ex. 5 | A | B | B | B | B | B |
| Ex. 6 | C | C | A | B | A | A |
| Ex. 7 | B | B | A | B | B | B |
| Ex. 8 | A | B | A | B | AA | AA |
| Ex. 9 | A | B | B | C | B | B |
| Comp. Ex. 1 | D | D | C | D | B | B |
| Comp. Ex. 2 | B | C | A | B | C | C |
| Comp. Ex. 3 | B | C | A | C | C | C |
| Comp. Ex. 4 | B | C | B | C | B | B |

From the results of Table 4 and Table 5, it was revealed that Example 1 was extraordinarily excellent in fixability over the impermeable base materials (the "PVC film" and the "PET" film), caused no beading even in a high-speed printing, provided images excellent in scratch resistance and non-transferability, and obtained a high discharging reliability and a high ink storage stability.

Example 2 resulted in a driability inferior to Example 1, because the organic solvent added for improvement of fixability had a relatively high boiling point.

Example 3 resulted in a stability inferior to Example 1, because the ink was free of a compound containing an alkoxy group.

Example 4 resulted in a fixability inferior to Example 1, because the organic solvent added for improvement of fixability had a relatively high Fh and slightly degraded permeability into the impermeable base materials.

Example 5 was an example in which the organic solvent added for improvement of fixability was slightly more than adequate, and resulted in a non-transferability and scratch resistance slightly inferior to Example 1.

Example 6 was an example in which the organic solvent added for improvement of fixability was slightly less than adequate, and resulted in a fixability slightly inferior to Example 1.

Example 7 was an example in which polyester resin particles were used, and resulted in a scratch resistance and discharging reliability slightly inferior to Example 1, in which polyurethane resin particles were used.

Example 8 was an example in which polyvinyl chloride resin particles were used, and resulted in a discharging reliability and ink storage stability slightly inferior to Example 1, in which polyurethane resin particles were used.

Example 9 was an example in which two kinds of organic solvents added for improvement of fixability were used in combination, and achieved results that were in no way inferior to Example 1.

In contrast, Comparative Examples 1 to 3 were examples in which the ink was free of a compound having a hydrogen bond term δH, which was a Hansen solubility parameter, of 4.1 MPa$^{1/2}$ or higher but 9.5 MPa$^{1/2}$ or lower and a boiling point of 170° C. or higher. Comparative Example 1 resulted in a fixability and non-transferability inferior to Example 1. Comparative Example 2 resulted in a scratch resistance, discharging reliability, and ink storage stability inferior to Example 1. Comparative Example 3 resulted in a scratch resistance and discharging reliability inferior to Example 1.

Comparative Example 4 resulted in an inferior discharging reliability and an inferior ink storage stability, because the ink was free of a diol compound containing 3 or 4 carbon atoms.

Solvent-based inks hitherto used have an excellent fixability over impermeable base materials because solvent-based inks fix while swelling the impermeable base materials with an organic solvent in the inks. Meanwhile, the water-based inks have problems that fixability over base materials is insufficient and high-speed printability is poor because the water-based inks merely attaches on the base materials as an ink coating film on the final recorded matters.

Furthermore, when outdoor use is assumed in terms of scratch resistance of recorded matters, recorded matters need to have properties such as scratch resistance, solvent resistance, and image hardness incomparably stronger than needed in indoor use. However, the water-based inks have problems that sufficient properties comparable to solvent-based inks are not obtained.

Moreover, water-based inks also need to be improved in non-transferability for preventing color transfer and damages between images when images are overlapped.

From the evaluation results, it was revealed that the inks of Examples 1 to 9 were suitable for outdoor use. It was also revealed that the inks of Examples 1 to 9 had fixability, scratch resistance, non-transferability, discharging reliability, and ink storage stability that were in no way inferior to solvent-based inks hitherto used.

Experimental Example

<Influence of Heating Conditions>

Fixability, non-transferability, and scratch resistance were evaluated in the same manners as in Example 1, except that the heating conditions (a heating temperature and a heating time) after recording were changed from Example 1 as presented in Table 6 below at No. 1 to No. 8. The results are presented in Table 6. The base material used was the "PVC film" mentioned above.

Note that in No. 8, a solid image was recorded in the same manner as in Example 1 using the ink of Example 1, and dried by being left to stand at 25° C. for 24 hours without heating after recording.

TABLE 6

|  | No. 1 | No. 2 | No. 3 | No. 4 | No. 5 | No. 6 | No. 7 | No. 8 |
|---|---|---|---|---|---|---|---|---|
| Heating temperature | 80° C. | 70° C. | 75° C. | 85° C. | 90° C. | 80° C. | 80° C. | None |
| Heating time | 1 hour | 1 hour | 1 hour | 1 hour | 1 hour | 10 minutes | 30 minutes | None |
| Fixability | A | A | A | A | A | A | A | A |
| Non-transferability | A | A | A | A | A | A | A | B |
| Scratch resistance | AA | AA | AA | AA | AA | A | AA | B | where in the mathematical formula 1, $\delta H$ represents a hydrogen bond term, which is a Hansen solubility parameter, $\delta D$ represents a dispersion term, which is a Hansen solubility parameter, and $\delta P$ represents a polarity term, which is a Hansen solubility parameter.

<4> The ink according to any one of <1> to <3>, wherein the at least one compound having a hydrogen bond term $\delta H$, which is a Hansen solubility parameter, of 4.1 MPa$^{1/2}$ or higher but 9.5 MPa$^{1/2}$ or lower and a boiling point of 170° C. or higher is at least one selected from the group consisting of 3-methoxy-N,N-dimethylpropionamide, 3-butoxy-N,N-dimethylpropionamide, diethylene glycol diethylether, tetramethylurea, 2-pyrrolidone, 1-n-octyl-2-pyrrolidone, and 1,3-dimethyl-2-imidazolidinone.

<5> The ink according to any one of <1> to <4>, wherein a content of the at least one compound having a hydrogen bond term $\delta H$, which is a Hansen solubility parameter, of 4.1 MPa$^{1/2}$ or higher but 9.5 MPa$^{1/2}$ or lower and a boiling point of 170° C. or higher is greater than or equal to 10% by mass but less than or equal to 50% by mass of a total content of the plurality of organic solvents.

<6> The ink according to any one of <1> to <5>, wherein the plurality of organic solvents further contain a compound containing an alkoxy group.

Aspects of the present invention are as follows, for example.

<1> An ink containing:
water;
a plurality of organic solvents;
a color material; and
resin particles,
wherein the plurality of organic solvents contain:
at least one compound having a hydrogen bond term $\delta H$, which is a Hansen solubility parameter, of 4.1 MPa$^{1/2}$ or higher but 9.5 MPa$^{1/2}$ or lower and a boiling point of 170° C. or higher; and
at least one diol compound containing 3 or 4 carbon atoms.

<2> The ink according to <1>, wherein the at least one diol compound containing 3 or 4 carbon atoms is at least one selected from the group consisting of 1,2-propanediol, 1,3-propanediol, 1,2-butanediol, and 2,3-butanediol.

<3> The ink according to <1> or <2>, wherein a ratio Fh of the at least one compound having a hydrogen bond term $\delta H$, which is a Hansen solubility parameter, of 4.1 MPa$^{1/2}$ or higher but 9.5 MPa$^{1/2}$ or lower and a boiling point of 170° C. or higher is 16% or higher but 25% or lower, where the ratio Fh is represented by a mathematical formula 1 below,

[Math. 3]

$$Fh\ (\%) = [\delta H / (\delta D + \delta P + \delta H)] \times 100 \quad \text{<Mathematical formula 1>}$$

<7> The ink according to <6>, wherein the compound containing an alkoxy group is 3-methoxy-3-methyl-1-butanol.

<8> The ink according to any one of <1> to <7>, wherein a boiling point of the plurality of organic solvents is 170° C. or higher but 250° C. or lower.

<9> The ink according to any one of <1> to <8>, wherein a total content of the plurality of organic solvents is greater than or equal to 20% by mass but less than or equal to 70% by mass.

<10> The ink according to any one of <1> to <9>, wherein the resin particles contain any one kind of polyurethane resin particles, polyester resin particles, and vinyl chloride-ethylene copolymer particles.

<11> The ink according to any one of <1> to <10>, wherein the resin particles are polyurethane resin particles.

<12> The ink according to any one of <1> to <11>, wherein a content of the resin particles is greater than or equal to 1% by mass but less than or equal to 15% by mass.

<13> The ink according to any one of <1> to <12>, wherein a volume average particle diameter of the resin particles is 10 nm or greater but 1,000 nm or less.

<14> The ink according to any one of <1> to <13>, wherein the color material is a pigment.

<15> An inkjet recording method including an ink flying step of applying a stimulus to the ink according to any one of <1> to <14> to fly the ink and record an image over a base material.

<16> The inkjet recording method according to <15>, further including a heating step of heating the base material over which the image is recorded.

<17> The inkjet recording method according to <15> or <16>, wherein the base material is an impermeable base material including an acrylic resin coating layer.

<18> The inkjet recording method according to any one of <15> to <17>, wherein the base material is a polyvinyl chloride film or a polyethylene terephthalate film.

<19> An inkjet recording apparatus including an ink flying unit configured to apply a stimulus to the ink according to any one of <1> to <14> to fly the ink and record an image over a base material.

<20> The inkjet recording apparatus according to <19>, further including a heating unit configured to heat the base material over which the image is recorded.

<21> The inkjet recording apparatus according to <20>, wherein heating performed by the heating unit is at 40° C. or higher but 120° or lower.

<22> The inkjet recording apparatus according to any one of <19> to <21>, wherein the base material is an impermeable base material including an acrylic resin coating layer.

<23> The inkjet recording apparatus according to any one of <19> to <22>, wherein the base material is a polyvinyl chloride film or a polyethylene terephthalate film.

<24> A recorded matter including:

a base material; and an image recorded over the base material with the ink according to any one of <1> to <14>.

<25> The recorded matter according to <24>, wherein the base material is an impermeable base material including an acrylic resin coating layer.

<26> The recorded matter according to <24> or <25>, wherein the base material is a polyvinyl chloride film or a polyethylene terephthalate film.

<27> An ink cartridge including:

the ink according to any one of <1> to <14>; and a container storing the ink.

The ink according to any one of <1> to <14>, the inkjet recording method according to any one of <15> to <18>, the inkjet recording apparatus according to any one of <19> to <23>, the recorded matter according to any one of <24> to <26>, and the ink cartridge according to <27> can solve the various related problems described above and achieve the object of the present invention.

REFERENCE SIGNS LIST

134 recording head
142 base material

The invention claimed is:

1. An ink, comprising:
water;
a plurality of organic solvents;
a color material; and
resin particles,
wherein the plurality of organic solvents comprise:
a first compound, which has a hydrogen bond term $\delta H$, which is a Hansen solubility parameter, of 4.1 MPa$^{1/2}$ or higher but 9.5 MPa$^{1/2}$ or lower and a boiling point of 170° C. or higher;
a diol compound that comprises 3 or 4 carbon atoms; and
a second compound having an alkoxy group, where the second compound comprises 3-methoxy-3-methyl-1-butanol.

2. The ink according to claim 1,
wherein the diol compound comprises at least one selected from the group consisting of 1,2-propanediol, 1,3-propanediol, 1,2-butanediol, and 2,3-butanediol.

3. The ink according to claim 1,
wherein a ratio Fh of the first compound is 16% or higher but 25% or lower, wherein the ratio Fh is represented by a mathematical formula 1:

$$Fh\ (\%)=[\delta H/(\delta D+\delta P+\delta H)]\times 100 \qquad \text{<Mathematical formula 1>}$$

wherein $\delta D$ represents a dispersion term, which is a Hansen solubility parameter, and $\delta P$ represents a polarity term, which is a Hansen solubility parameter.

4. The ink according to claim 1,
wherein the first compound comprises at least one selected from the group consisting of 3-methoxy-N,N-dimethylpropionamide, 3-butoxy-N,N-dimethylpropionamide, diethylene glycol diethylether, tetramethylurea, 2-pyrrolidone, 1-n-octyl-2-pyrrolidone, and 1,3-dimethyl-2-imidazolidinone.

5. The ink according to claim 1,
wherein a content of the first compound is greater than or equal to 10% by mass but less than or equal to 50% by mass of a total content of the plurality of organic solvents.

6. The ink according to claim 1,
wherein a boiling point of the plurality of organic solvents is 170° C. or higher but 250° C. or lower.

7. The ink according to claim 1,
wherein a total content of the plurality of organic solvents is greater than or equal to 20% by mass but less than or equal to 70% by mass.

8. The ink according to claim 1,
wherein the resin particles comprise polyurethane resin particles.

9. An inkjet recording method, comprising:
applying a stimulus to an ink to fly the ink and record an image over a base material,
wherein the ink comprises:
water;
a plurality of organic solvents;
a color material; and
resin particles,
wherein the plurality of organic solvents comprise:
a first compound, which has a hydrogen bond term $\delta H$, which is a Hansen solubility parameter, of 4.1 MPa$^{1/2}$ or higher but 9.5 MPa$^{1/2}$ or lower and a boiling point of 170° C. or higher;
a diol compound that comprises 3 or 4 carbon atoms; and
a second compound having an alkoxy group, where the second compound comprises 3-methoxy-3-methyl-1-butanol.

10. The inkjet recording method according to claim 9, further comprising:
heating the base material over which the image is recorded.

11. The inkjet recording method according to claim 9,
wherein the base material is an impermeable base material that comprises an acrylic resin coating layer.

12. The inkjet recording method according to claim 9,
wherein the base material is a polyvinyl chloride film or a polyethylene terephthalate film.

13. An inkjet recording apparatus, comprising
an ink flying unit configured to apply a stimulus to an ink to fly the ink and record an image over a base material,
wherein the ink comprises:
water;
a plurality of organic solvents;
a color material; and
resin particles,
wherein the plurality of organic solvents comprise:
a first compound, which has a hydrogen bond term δH, which is a Hansen solubility parameter, of 4.1 MPa$^{1/2}$ or higher but 9.5 MPa$^{1/2}$ or lower and a boiling point of 170° C. or higher;
a diol compound that comprises 3 or 4 carbon atoms; and
a second compound having an alkoxy group, where the second compound comprises 3-methoxy-3-methyl-1-butanol.

14. The inkjet recording apparatus according to claim 13, further comprising:
a heating unit configured to heat the base material over which the image is recorded.

15. The inkjet recording apparatus according to claim 13, wherein the base material is an impermeable base material that comprises an acrylic resin coating layer.

16. The inkjet recording apparatus according to claim 13, wherein the base material is a polyvinyl chloride film or a polyethylene terephthalate film.

17. A recorded matter, comprising:
a base material; and
an image recorded over the base material with the ink according to claim 1.

18. The ink according to claim 1, wherein a content of the second compound is greater than or equal to 1% by mass but less than or equal to 10% by mass of a total content of the plurality of organic solvents.

19. The ink according to claim 1, wherein a content of the second compound is greater than or equal to 2% by mass but less than or equal to 6% by mass of a total content of the plurality of organic solvents.

20. The ink according to claim 1,
wherein a content of the first compound is greater than or equal to 10% by mass but less than or equal to 50% by mass of a total content of the plurality of organic solvents,
a content of the diol compound is greater than or equal to 5% by mass but less than or equal to 40% by mass of the total content of the plurality of organic solvents, and
a content of the second compound is greater than or equal to 1% by mass but less than or equal to 10% by mass of the total content of the plurality of organic solvents.

* * * * *